(12) United States Patent
Lad et al.

(10) Patent No.: US 8,237,871 B2
(45) Date of Patent: Aug. 7, 2012

(54) SYSTEM AND METHOD FOR AN INTERNET TELEVISION REMOTE CONTROL

(75) Inventors: Amol Lad, Bangalore (IN); Huzefa Saifee, Bangalore (IN)

(73) Assignee: Verismo Networks Inc, Santa Clara, CA (US)

( * ) Notice: Subject to any disclaimer, the term of this patent is extended or adjusted under 35 U.S.C. 154(b) by 796 days.

(21) Appl. No.: 12/200,932

(22) Filed: Aug. 29, 2008

(65) Prior Publication Data

US 2010/0053461 A1    Mar. 4, 2010

(51) Int. Cl.
*H04N 5/44* (2011.01)
*H04N 5/445* (2011.01)
*H04N 7/16* (2011.01)
*G06F 3/00* (2006.01)
*G06F 13/00* (2006.01)
*G06F 3/033* (2006.01)
*G09G 5/08* (2006.01)
*G08C 19/12* (2006.01)
*H04L 17/02* (2006.01)
*H04R 29/00* (2006.01)

(52) U.S. Cl. ............ 348/734; 725/37; 725/28; 345/157; 341/173; 381/60

(58) Field of Classification Search .................. None
See application file for complete search history.

(56) References Cited

U.S. PATENT DOCUMENTS

| | | | | |
|---|---|---|---|---|
| 5,724,106 A * | 3/1998 | Autry et al. | .................. | 348/734 |
| 5,844,552 A * | 12/1998 | Gaughan et al. | ................. | 725/37 |
| 6,292,172 B1 * | 9/2001 | Makhlouf | ..................... | 345/157 |
| 6,970,127 B2 * | 11/2005 | Rakib | ............................ | 341/173 |
| 2001/0033664 A1 * | 10/2001 | Poux et al. | ...................... | 381/60 |
| 2002/0044225 A1 * | 4/2002 | Rakib | ............................ | 348/734 |
| 2005/0028191 A1 * | 2/2005 | Sullivan et al. | ................. | 725/28 |

* cited by examiner

*Primary Examiner* — Jefferey Harold
*Assistant Examiner* — Sean Haiem
(74) *Attorney, Agent, or Firm* — Prakash Nama; Global IP Services, PLLC

(57) ABSTRACT

A handheld electronic apparatus for communicatively coupling a user and a display device is disclosed. In one embodiment, the handheld electronic apparatus includes a user interface configured to accept an user input, the user interface further includes a first interface configured to accept the user input via a keypad, and a second interface configured to accept the user input via a touchpad. The handheld electronic apparatus also includes a processor configured to generate a signal by processing the user input, and a transmitter adapted to transmit the signal generated by the processor to the display device.

27 Claims, 15 Drawing Sheets

SYSTEM AND METHOD FOR AN INTERNET TELEVISION REMOTE CONTROL

FILED OF THE INVENTION

Embodiments of the present invention relate generally to television and Internet and more particularly, embodiments of the present invention relate to a system and method for an Internet Television remote control.

BACKGROUND

In the past, television programs have been marked by time constraints and geographical constraints. For example, television programs have been made available only during certain hours of the day/week. Viewers have been using a typical remote control to navigate through and select a desired program from the limited programs, broadcasted on the limited number of channels. Generally, television programs are broadcasted by local cable providers, mainly for consumption of local population. Because television programs have been somewhat confined to a geographical area, television programs have been marked by use of native language, native cultural references and subject matters of local interest.

Further, development of the Internet has drastically changed the profile of world business in past few decades. Entertainment business is no exception to this global change. In particular, unlimited media content is presented across the world by Internet Television. Unlike the television programs of the past, the Internet Television does not have either time constraints or geographical constraints. Currently, any user of the Internet Television is able to enjoy any program on the Internet at any time and at any place.

Increasing popularity of Internet media repository, such as You Tube®, presenting an array of media content for entertainment of its viewers, suggests the popular demand for the Internet Television. Many programs have been made available on the Internet Television. Further, viewers may no longer be able to use conventional remote control devices (e.g., with limited features) for viewing available options and making a selection from the displayed options. As a consequence, a user may have to navigate through a sophisticated Internet interface to locate desired media content. Navigating vast domain of the Internet media, using up and down arrow keys of the remote control device can be cumbersome.

Furthermore, the conventional remote control devices may not have ability to provide sophisticated navigation interface required for the Internet Television. Internet Television users may have to specify a web address for accessing media resource on the Internet. However, the conventional remote control devices may not have an input device for entering the web address. Thus, the conventional remote control devices may not be able to cater to the sophisticated navigation requirements of the Internet Television. Accordingly, the development of the Internet Television necessitates a need for a navigation device for efficient surfing through the media content, available on the Internet.

BRIEF DESCRIPTION OF THE DRAWINGS

Embodiments of the present invention are illustrated by way of examples and are not limited to the figures of the accompanying drawings, in which like references indicate similar elements and in which.

Other features of the present embodiments will be apparent from the accompanying drawings and from the detailed description that follows.

DETAILED DESCRIPTION

A system and method for an Internet Television remote control is disclosed. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

The terms "Internet Television remote control", "handheld electronic apparatus" and "remote control device" are interchangeably used throughout the document. Further, the term "QWERTY® remote control device refers to a remote control with a QWERTY® keypad.

Figure 1:
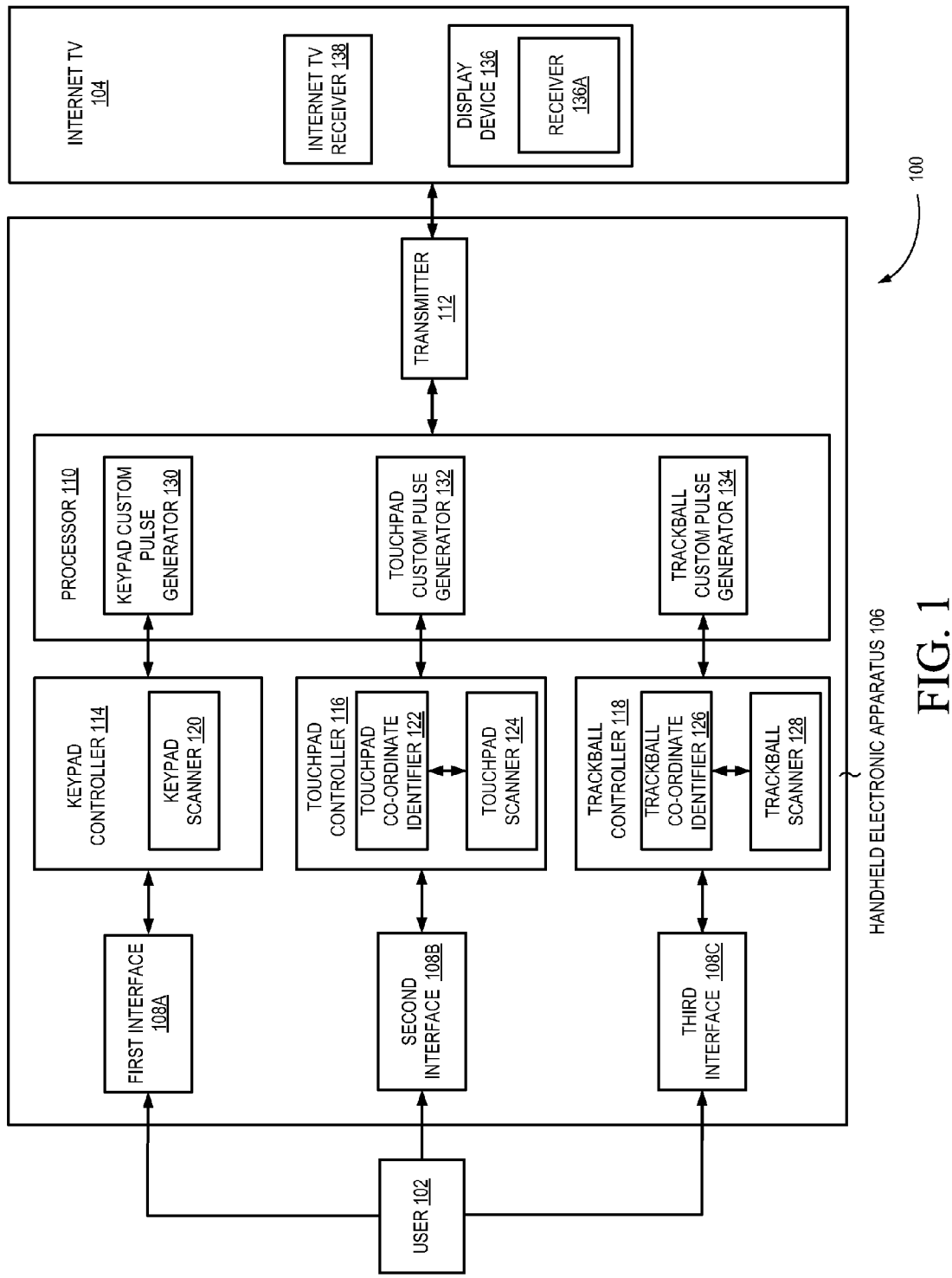
FIG. 1 shows a block diagram illustrating various components of a handheld electronic apparatus, according to one embodiment.

FIG. 1 shows a block diagram 100 illustrating various components of a handheld electronic apparatus 106, according to one embodiment. Particularly, FIG. 1 illustrates coupling of a user 102 and an Internet Television (Internet TV) 104 through the handheld electronic apparatus 106. As shown in FIG. 1, the handheld electronic apparatus 106 includes a first interface 108A, a second interface 108B, a third interface 108C, a processor 110, a transmitter 112, a keypad controller 114, a touchpad controller 116 and a trackball controller 118.

It can be also seen from FIG. 1 that, the keypad controller 114 includes a keypad scanner 120, the touchpad controller 116 includes a touchpad co-ordinate identifier 122 and a touchpad scanner 124, and the trackball controller 118 includes a trackball co-ordinate identifier 126 and a trackball scanner 128. Further, the processor 110 includes a keypad custom pulse generator 130, a touchpad custom pulse generator 132 and a trackball custom pulse generator 134. The Internet TV 104 includes an Internet TV receiver 138 and a display device 136 including a receiver 136A, as illustrated in FIG. 1.

In some embodiments, the handheld electronic apparatus 106 receives an user input from the user 102 for wirelessly controlling the Internet TV 104. In these embodiments, the user input includes a request to navigate the Internet via the Internet TV 104 to locate multimedia contents. It is appreciated that the processor 110 is configured to generate a signal by processing the user input. Also, the transmitter 112 is configured to transmit the signal to a display device 136 of the Internet TV 104 and the receiver 136A is adapted to receive the signal transmitted by the transmitter 112. For example, the display device 136 includes the receiver 136A.

In one embodiment, the first interface 108A accepts the user input. In this embodiment, the first interface 108A is configured to accept the user input via a keypad. In one embodiment, the keypad may be a QWERTY® keypad (e.g., containing 48 keys). In another embodiment, the keypad may be a regular keypad. For example, the keypad includes QWERTY® keypad keys/regular keypad keys, multiplex keys, and alteration keys. In one exemplary implementation, the alteration keys are configured to perform a dual mode function, where a first key press on an alteration key enables a secondary mode for the alteration key, and a second key press on the same alteration key enables a primary mode for the alteration key. The multiplex keys are configured to perform a set of navigation functions when the receiver 136A is in a browse mode and to perform a set of trickmode functions (e.g., the functions which enable playing media content in a fast-forward mode, a fast-rewind mode, playing next media content, playing previous media content, etc.) when the receiver 136A is in a playback mode.

In some embodiments, the keypad controller 114 is communicatively coupled with the processor 110 via input/output (I/O) lines of the processor 110 and is configured to control the keypad. In one embodiment, the keypad controller 114 is adapted to generate a keypad interrupt to the processor 110 upon receiving a key press. In this embodiment, the keypad controller 114 includes the keypad scanner 120 that identifies a keypad scan code corresponding to the key press on the first interface 108A in a keypad scan code matrix (e.g., the keypad scan code matrix 506 of FIG. 5).

For example, the keypad scan code matrix is an (m×n) matrix including n bits of column lines and m bits of row lines that are connected to (m+n) input/output (I/O) lines of the processor 110. In one exemplary implementation, the keypad scan code matrix includes a set of regular keypad scan codes, a set of capital alphabet keypad scan codes, a set of numeric keypad scan codes and a set of symbolic keypad scan codes. In some embodiments, after receiving the keypad scan code from the keypad scanner 120, the keypad custom pulse generator 130 of the processor 110 generates a custom pulse for transmitting the keypad scan code to the Internet TV 104.

In another embodiment, the second interface 108B accepts the user input. In this embodiment, the second interface 108B is configured to accept the user input via a touchpad. For example, the user input received via the second interface 108B includes a touchpad activity indicated by an activation of the touchpad in a control mode or in a navigation mode. In some embodiments, the touchpad controller 116 is configured to control the touchpad and is communicatively coupled with the processor 110 via an universal asynchronous receiver/transmitter (UART) link. In these embodiments, the touchpad controller 116 is adapted to generate a touchpad interrupt via an interrupt (INT) link to the processor 110 upon detecting the touchpad activity.

As illustrated in FIG. 1, the touchpad controller 116 includes the touchpad co-ordinate identifier 122 and the touchpad scanner 124. The touchpad co-ordinate identifier 122 determines a set of coordinates on the second interface 108B indicated by the touchpad activity and the touchpad scanner 124 locates a touchpad scan code for the set of coordinates on the second interface 108B (that is determined by the touchpad co-ordinate identifier 122) in a touchpad scan code matrix. In some embodiments, the touchpad custom pulse generator 132 of the processor 110 generates a custom pulse to transmit the touchpad scan code located by the touchpad scanner 124.

In yet another embodiment, the third interface 108C accepts the user input. In this embodiment, the third interface 108C is configured to accept the user input via a trackball. For example, the user input received via the third interface 108C includes a trackball activity indicated by an activation of the trackball in a control mode or in a navigation mode. In some embodiments, the trackball controller 118 is communicatively coupled with the processor 110 via a set of input/output (I/O) lines and is configured to control the trackball. For example, the trackball controller 118 is adapted to generate a trackball interrupt to the processor 110 upon detecting the trackball activity. Further, the trackball controller 118 includes the trackball co-ordinate identifier 126 and the trackball scanner 128.

The trackball co-ordinate identifier 126 determines a set of coordinates on the third interface 108C indicated by the trackball activity and the trackball scanner 128 locates a trackball scan code for the set of coordinates on the third interface 108C in a trackball scan code matrix. Further, the trackball custom pulse generator 134 of the processor 110 generates a custom pulse to transmit the trackball scan code. In accordance with one or more embodiments described above, the Internet TV receiver 138 gets audio/video input from the Internet and the receiver 136A gets input from the user 102 via the transmitter 112 of the handheld electronic apparatus 106. Further, the handheld electronic apparatus 106 has a receiver (not shown in FIG. 1) to get feedback from the Internet TV 104 and also a display area to display input, entered by the user 102 (e.g., via the first interface 108A).

Figure 2:
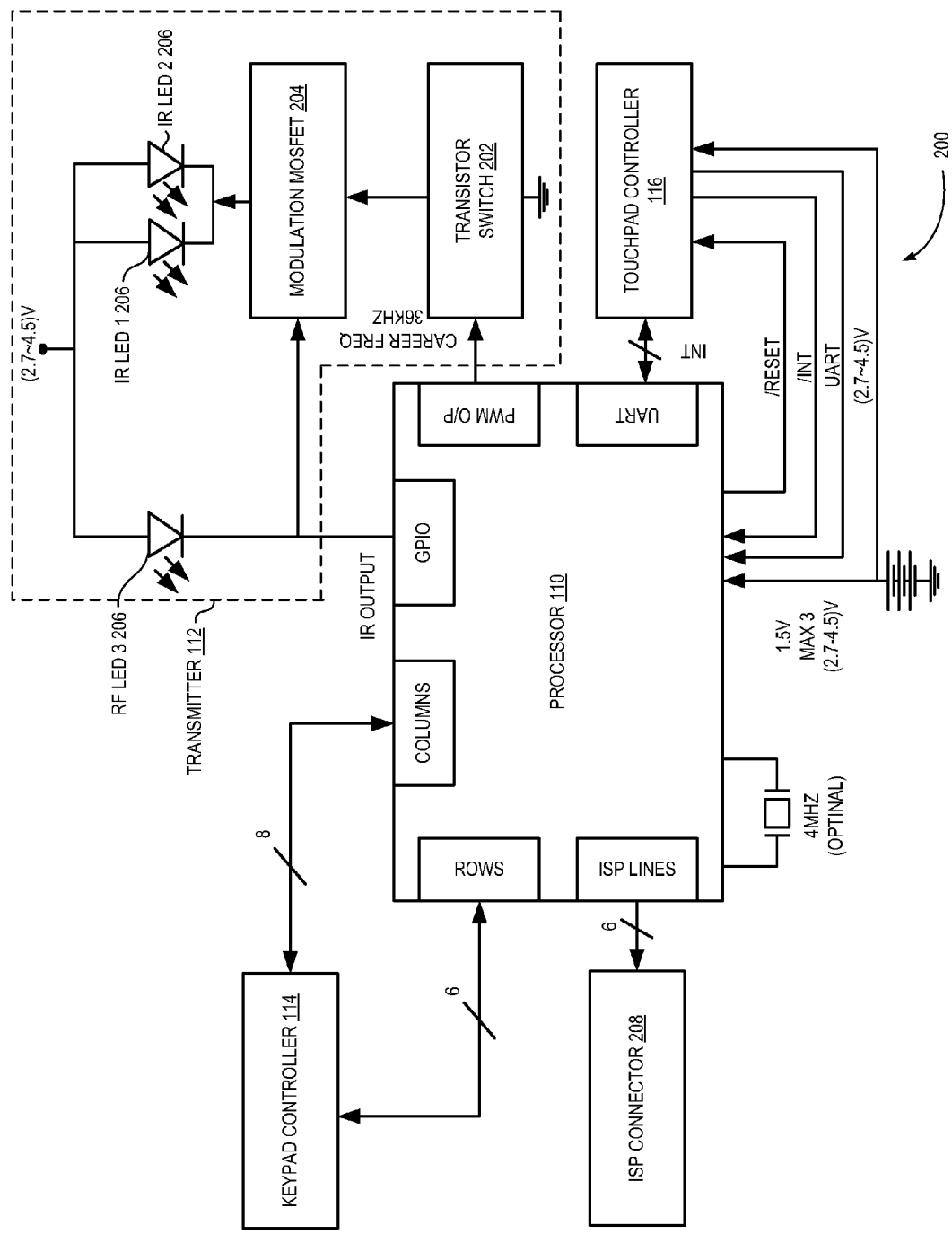
FIG. 2 shows a block diagram illustrating a high level architecture of the processor used in the handheld electronic apparatus, according to one embodiment.

FIG. 2 shows a block diagram 200 illustrating a high level architecture of the processor 110 used in the handheld electronic apparatus 106 (e.g., the QWERTY® remote control device), according to one embodiment. Particularly, FIG. 2 illustrates the processor 110, the keypad controller 114, the touchpad controller 116, a transistor switch 202, a modulation metal oxide semiconductor field effect transistor (MOSFET) 204, light emitting diodes (LEDs) 1-3 206 and an in system programming (ISP) connector 208. It can be noted that the transistor switch 202, the modulation MOSFET 204, and the LEDs 1-3 206 are main components of the transmitter 112.

In one exemplary implementation, the processor 110 as shown in FIG. 2, is an 8 bit processor, and includes 8 KB of flash memory and 1 KB of internal random access memory (RAM). In addition, the processor 110 includes two 8 bit timers, one 16 bit timer (with phase width modulation support) and a programmable watch dog timer with separate internal oscillator. Also, it is noted that the processor 110 has a maximum speed of 8 MHz and can operate in various low power modes. One can envision that the processor 110 used in the QWERTY® remote control device 106 is not limited to the features described above, and may include additional features.

As shown in FIG. 2, the keypad controller 114 is communicatively coupled to the processor 110 via the I/O lines and the touchpad controller 116 is communicatively coupled to the processor 110 via the UART link. In one embodiment, 6 bits of row lines and 8 bits of column lines of the keypad controller 114 are coupled to 14 I/O lines of the processor 110. Further, the ISP connector 220 is communicatively coupled to the processor 110 via ISP lines. In one exemplary implementation, the ISP connector 208 is a programming and debug port.

In operation, the keypad controller 114 generates a keypad interrupt to the processor 110 upon receiving a key press. Based on the keypad interrupt, the processor 110 generates a signal by processing the keypad interrupt. Further, the processor 110 generates a custom pulse (e.g., the custom pulse 900 of FIG. 9) for transmitting the generated signal. In one embodiment, the custom pulse is outputted to the modulation MOSFET 204 and the radio frequency (RF) LED 3 206 via general purpose input/output (GPIO) pins of the processor 110.

For example, the custom pulse is generated by toggling the GPIO pin (whenever required). In this embodiment, the processor 110 generates and inputs a sub carrier for the custom pulse to the transistor switch 202 via a pulse width modulator (PWM) output pin. In one exemplary implementation, the sub carrier for the custom pulse is a square wave form of 36 KHz frequency and includes 28 μsec high and low periods. It can be noted that the 36 KHz waveform is generated using a clear time on compare match (CTC) mode (also referred as non-PWM mode).

The transistor switch 202 then switches the sub carrier for the custom pulse and forwards the amplified signal to the modulation MOSFET 204. Based on the received signal generated by the processor 110, the modulation MOSFET 204 transmits the signal to the receiver 136A of the display device 136 via the IR LED 1-2 206 (acting as an intermediate frequency (IF) transmit port pin). In one exemplary implementation, the signal transmitted by the modulation MOSFET 204 ranges from 2.5-4.5 volts. As shown in FIG. 2, the IR LED 1-2 206 and the RF LED 3 206 may transmit the signal received from the modulation MOSFET 204 and the GPIO pin of the processor 110 respectively.

Similarly, in operation, the touchpad controller 116 generates a touchpad interrupt to the processor 110 upon detecting a touchpad activity. In one exemplary implementation, the touchpad controller 116 generates the touchpad interrupt to the processor 110 via the INT link. Further, processing and transmission of the signal based on the touchpad activity is performed in a similar manner as explained in the foregoing description.

Although the foregoing description of FIG. 2 explains the processor 110 that is configured to receive a keypad interrupt and a touchpad interrupt from the keypad controller 114 and the touchpad controller 116 respectively, one can envision that the processor 110 can be configured to receive and process a trackball interrupt from the trackball controller (e.g., the trackball controller 118 of FIG. 1) of the QWERTY® remote control device 106.

Figure 3:
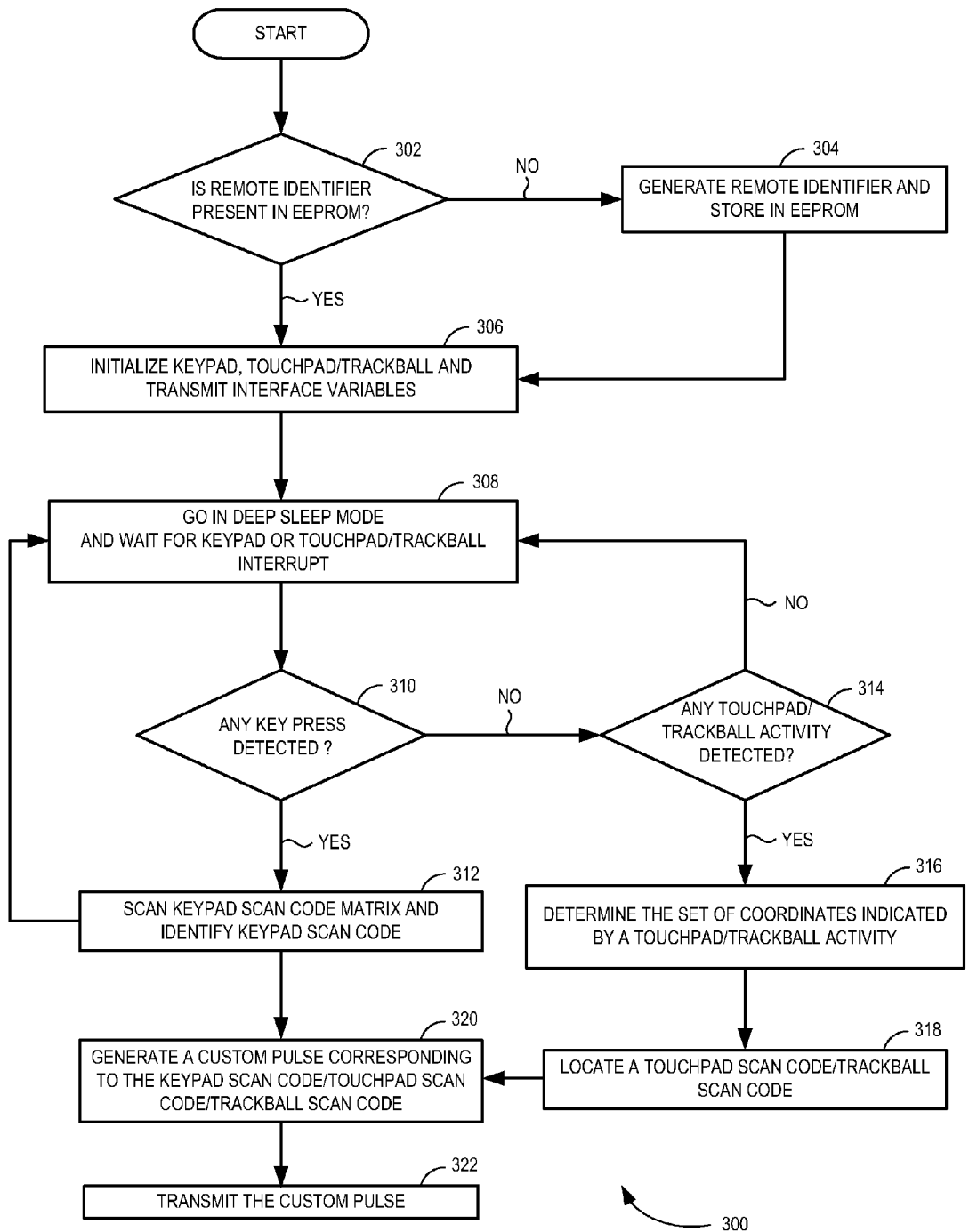
FIG. 3 shows a process flow illustrating main processes executed by the processor of FIG. 1, according to one embodiment.

FIG. 3 shows a process flow 300 illustrating main processes executed by the processor 110 of FIG. 1, according to one embodiment. In step 302, it is checked whether a remote identifier is present in electrically erasable programmable read-only memory (EEPROM). In one embodiment, if it is determined that the remote identifier is present in the EEPROM in step 302, then, the process 300 performs step 306. If it is determined that there is no remote identifier present in the EEPROM, the remote identifier is generated and stored in the EEPROM, as in step 304. In an alternate embodiment, if the remote identifier does not exist in the EEPROM, then the process 300 performs step 304 and then goes to step 306. In step 306, a keypad, a touchpad and/or a trackball are initialized (e.g., activated) and interface variables (e.g., scan codes) are transmitted. In one embodiment, the keypad, the touchpad and/or the trackball are initialized to accept an user input (i.e., a request to navigate the Internet via the Internet TV 104 to locate multimedia contents) from a user 102. In one embodiment, the touchpad and trackball may be initialized in a control mode, or in a navigation mode. For example, the control mode enables media playing functions such as fast forward, rewind, play, stop, pause, etc. Further, the navigation mode enables display options such as select, browse forward, browse backward, return to main page, one level up on web page, etc.

Upon initialization, the keypad, the touchpad and/or the trackball goes into a deep sleep mode and waits for a keypad, a touchpad and/or a trackball interrupt in step 308. In one example embodiment, the keypad interrupt, the touchpad interrupt and the trackball interrupt to the processor 110 are generated upon detecting a keypad press, a touchpad activity, and a trackball activity respectively. In step 310, it is determined whether any key press on the keypad is detected. If the key press is detected in step 310, then a keypad scan code matrix (e.g., the keypad scan code matrix 506 of FIG. 5) is scanned and a keypad scan code corresponding to the key press is identified in step 312, else the process 300 performs step 314. Upon generating the keypad scan code, the process 300 goes in a deep sleep mode and waits for the next interrupt.

Figure 4:
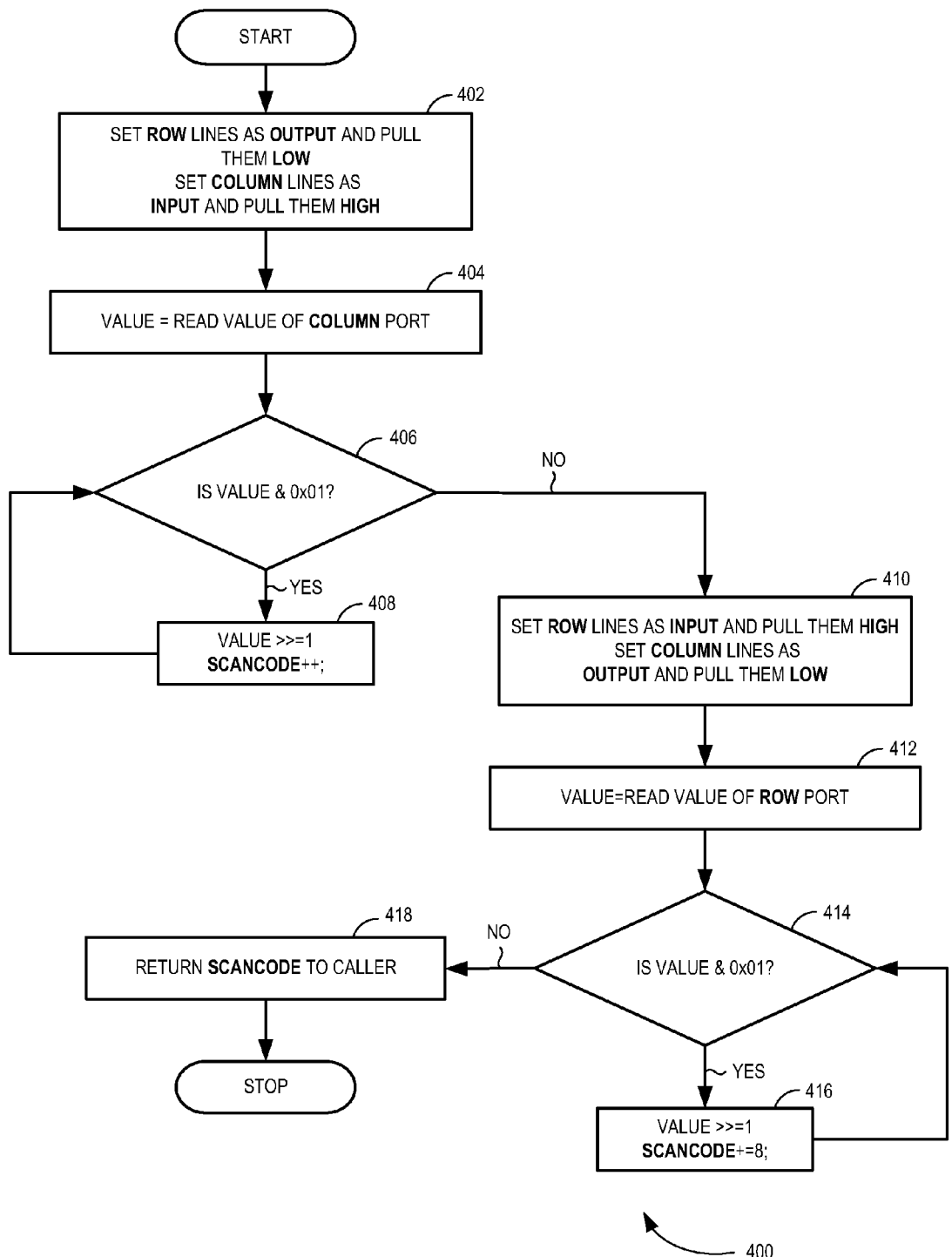
FIG. 4 shows a process flow illustrating a key press scan implemented by the processor of FIG. 1, according to one embodiment.

Further, the identification of keypad scan code is explained in detail in FIG. 4. In step 314, it is determined whether any touchpad or trackball activity is detected. If a touchpad activity or a trackball activity is detected in step 314, then a set of coordinates, on the touchpad or trackball indicated by the touchpad activity or the trackball activity, is determined in step 316, else the process 300 goes in a deep sleep mode and waits for the next interrupt. Further, a touchpad scan code or a trackball scan code for the set of coordinates in the touchpad or trackball scan code matrix is located in step 318. In step 320, a custom pulse corresponding to the keypad scan code, the touchpad scan code, or the trackball scan code is generated (e.g., by the processor 110 of FIG. 1). In step 322, the custom pulse is transmitted to a transmitter 112. It can be noted that the custom pulse includes a plurality of frames and each frame includes a plurality of bits encoded in a bi-phase encoding.

FIG. 4 is a process flow 400 illustrating a key press scan implemented by the processor 110 of FIG. 1, according to one embodiment. In some embodiments, FIG. 4 illustrates scanning of a keypad scan code matrix using an algorithm. In these embodiments, the algorithm identifies a key pressed by the user 102 causing a key press, which generates a keypad scan code corresponding to the key press. For example, the algorithm determines the key pressed corresponding to a row and a column that are activated. The organization of rows and columns in the keypad scan code matrix is explained in greater detail with respect to FIG. 5.

In step 402, row lines of the keypad scan code matrix are set as output and pulled (e.g., the row lines) low, and column lines of the keypad scan code matrix are set as input and pulled (e.g., the column lines) high. In some embodiments, when a key is pressed, column port and row port corresponding to the pressed key are read as low. Steps 404, 406 and 408 are performed to find out which column port is low when a key is pressed. In step 404, value of each column port is read. In some embodiments, all columns are activated and value of each column port is read subsequently. In step 406, a condition check is made to determine which column port value reads high. If the check made in step 406 is false, then the process 400 performs step 410 to determine which row port corresponding to the column port (which is determined low in step 406) reads low, else the process 400 goes to step 408 to activate next column port(s) such that, value of next column port is read.

In step 410, the row lines of the keypad scan code matrix are set as input and pulled high, and column lines of the keypad scan code matrix are set as output and pulled low. Further, steps 412, 414 and 416 are performed to find out which row port reads low corresponding to the column port which is read as low. In step 412, value of each row port is read. In step 414, a condition check is made to determine which one of the row port reads high. If the check made in step 414 is false, the process 400 goes to step 418, else the process 400 goes to step 416 for activating next row port(s) such that value of next row port is read.

Finally, in step 418, a scan code is generated from the identified row and column (which is read low) and is returned to a caller. Although the process 400 describes one way of scanning the keypad scan code matrix, one skilled in the art can envision that the keypad scan code matrix can be scanned in several ways and not limited to the method described above.

Figure 5:
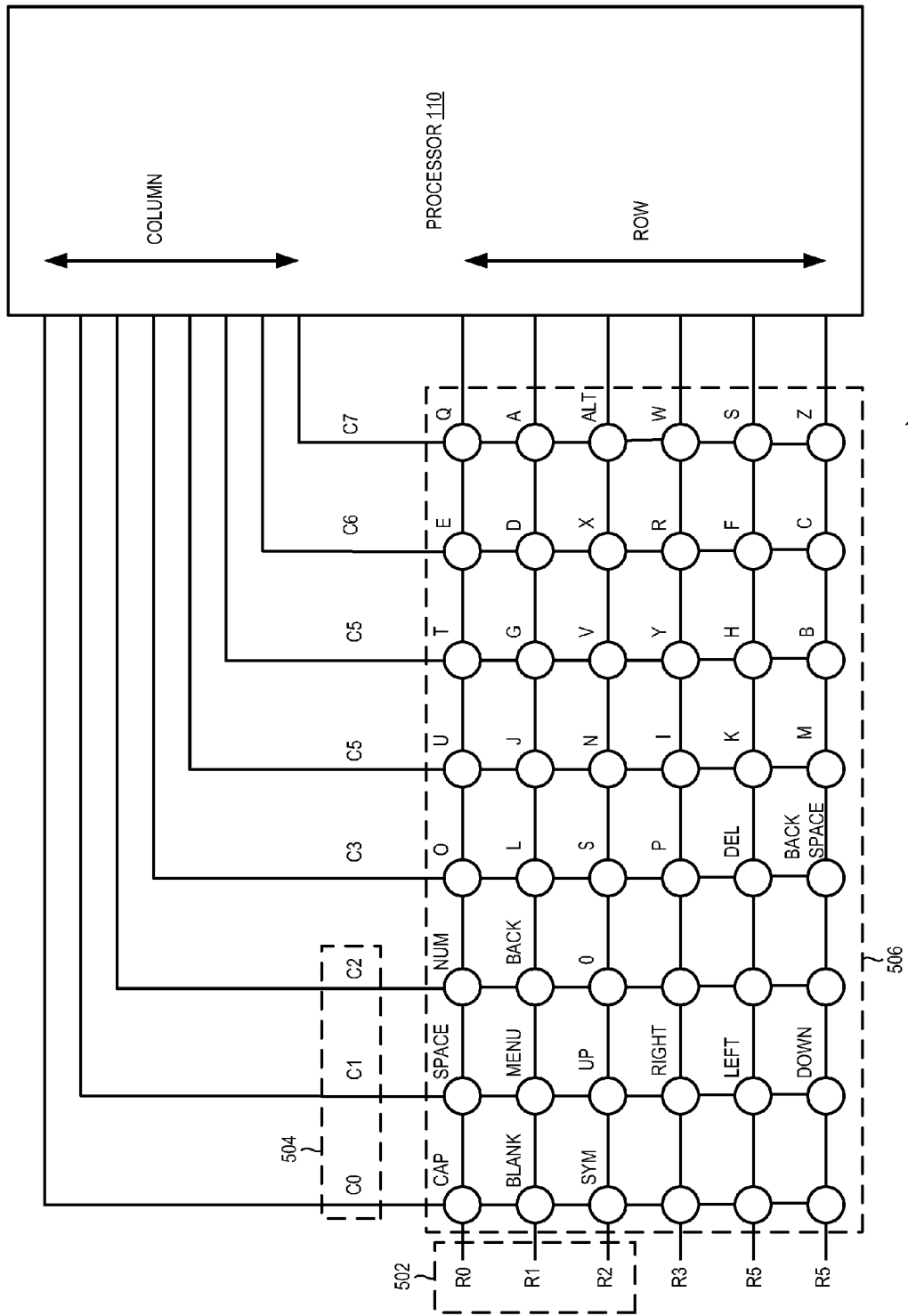
FIG. 5 shows a keypad scan code matrix organization, according to one embodiment.

FIG. 5 shows a keypad scan code matrix organization, according to one embodiment. Particularly, FIG. 5 illustrates a keypad scan code matrix 506 coupled to the I/O lines of the processor 110. In one exemplary implementation, the keypad scan code matrix 506 is an (m×n) matrix including m bits of row lines 502 and n bits of column lines 504 that are connected to (m+n) I/O lines of the processor 110. In the example embodiment illustrated in FIG. 5, the keypad scan code matrix 506 is a 6×8 matrix including 8 bits of column lines 504 (i.e., C0 to C7) and 6 bits of row lines 502 (i.e., R0 to R5) that are connected to 14 I/O lines of the processor 110. Further, it is appreciated that the keypad scan code matrix 506 is organized in a QWERTY® keypad layout.

It is also appreciated that keypad scan code matrix 506 includes a set of QWERTY® keypad keys, a set of multiplex keys, and a set of alteration keys (e.g., SYM, NUM, CAPS, etc.). In one embodiment, the set of alteration keys is configured to perform a dual mode function. For example, a first key press on an alteration key enables a secondary mode for the alteration key and a second key press on the same alteration key enables a primary mode for the alteration key.

Further, it can be noted that the QWERTY® keypad scan code matrix 506 does not support simultaneous key presses. Hence, following cases can be considered:

1. When none of the alteration keys are active; major scan code for a key (e.g., lower case alphabet, $, etc.) is processed.
2. If NUM key is pressed, followed by other keys, then number associated with that key is processed. To return to normal mode (i.e., as in step 1), the user needs to press the NUM key again.
3. If CAPS key is pressed, followed by other keys, then capital alphabets associated with that key is processed. To return to normal mode (i.e., as in step 1), the user needs to press the CAPS key again.
4. If user pressed SYM key, followed by other keys, then symbol associated with that key is processed. To return to normal mode (i.e., as in step 1), the user needs to press the SYM key again.

In another embodiment, the set of multiplex keys is configured to perform a set of navigation functions when the receiver 136A is in a browse mode and to perform a set of trickmode functions when the receiver 136A is in a playback mode.

The keypad scan code matrix 506 illustrated in FIG. 5 includes a set of regular keypad scan codes, a set of capital alphabet keypad scan codes, a set of numeric keypad scan codes, and a set of symbolic keypad scan codes. It is appreciated that the keypad scan codes are stored in the 6×8 two dimensional tables. Further, it can be seen from FIG. 5 that, each key in the keypad scan code matrix 506 is associated with a single bit of row and column lines. For example, Q key is at node C7R0, W key is at node C7R3, E key is at node C6R0, R key is at node C6R3, T key is at node C5R0, and Y key is at node C5R3 and so on.

In one embodiment, the column and row lines in the keypad scan code matrix 506 are made up of wires. Thus, when a key is pressed, a column wire makes contact with a row wire and completes a circuit. Further, the keypad controller 114 scans all columns C0 to C7, detects the closed circuit and registers the key press. Based on which key is pressed, a keypad scan code corresponding to the key press is identified and a custom pulse is generated and transmitted accordingly. Further, the scanning the keypad scan code matrix 506 and generating the keypad scan codes corresponding to the key press is explained in greater detail with respect to FIG. 4.

Figure 6:
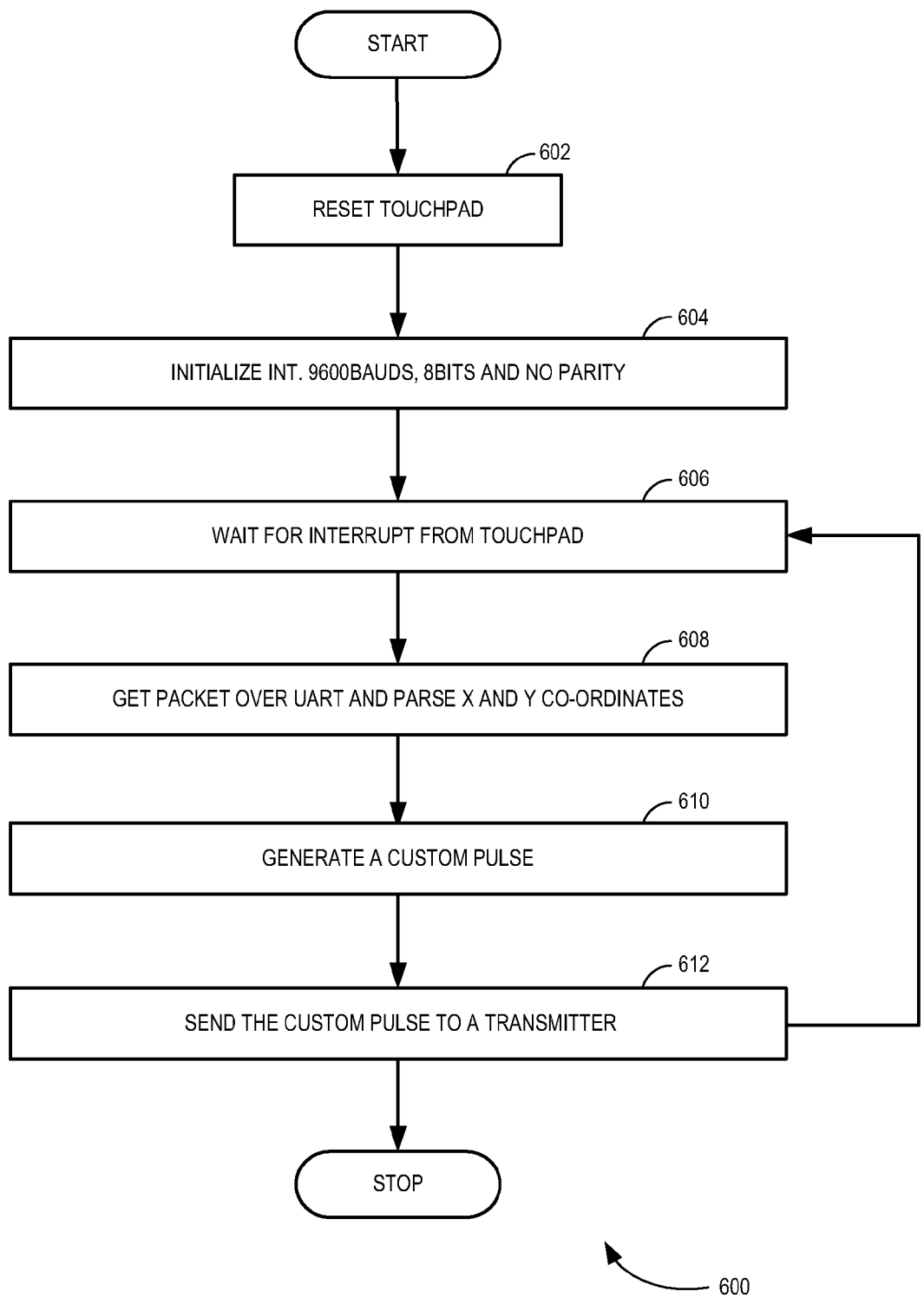
FIG. 6 shows a process flow illustrating a touchpad interface, according to one embodiment.

FIG. 6 shows a process flow 600 illustrating a touchpad interface, according to one embodiment. In step 602, touchpad is reset. In one embodiment, the touchpad is reset to receive an user input from the user 102. It can be noted that the touch pad is divided into sub-areas. For example, at first, a value of each sub-area is set to zero and upon detection of a touchpad activity, i.e., when a specific sub-area is touched, the value of the sub-area is changed to one. In step 604, an UART link between the touchpad controller 116 and the processor 110 is initialized to transmit data at baud rate of 9600. In one embodiment, parity bit may be set to zero at the initialization stage.

In step 606, the process 600 waits for an interrupt form the touchpad. In one exemplary implementation, the touchpad controller 116 generates a touchpad interrupt (via an INT link) to the processor 110 upon detection of the touchpad activity. It is appreciated that the touchpad controller 116 periodically checks values of each sub-areas, and upon detecting a change in value of the sub-area, the touchpad controller 116 generates a touchpad interrupt. In one embodiment, the processor 110 periodically pings the touchpad controller 116 to check if a touchpad interrupt has been raised.

In step 608, packet is obtained over the UART link and x and y co-ordinates are parsed. In step 610, a custom pulse (e.g., the custom pulse 1000 of FIG. 10) is generated (e.g., by the processor 110 of FIG. 1). For example, the custom pulse includes a plurality of frames and each frame includes a plurality of bits encoded in a bi-phase encoding. In one embodiment, the custom pulse is generated based on the touchpad scan code. In step 612, the custom pulse is sent to a transmitter 112 by the processor 110. The process 600 goes to step 606 and waits for interrupt from touchpad, upon transmitting the custom pulse in step 612.

Figure 7:
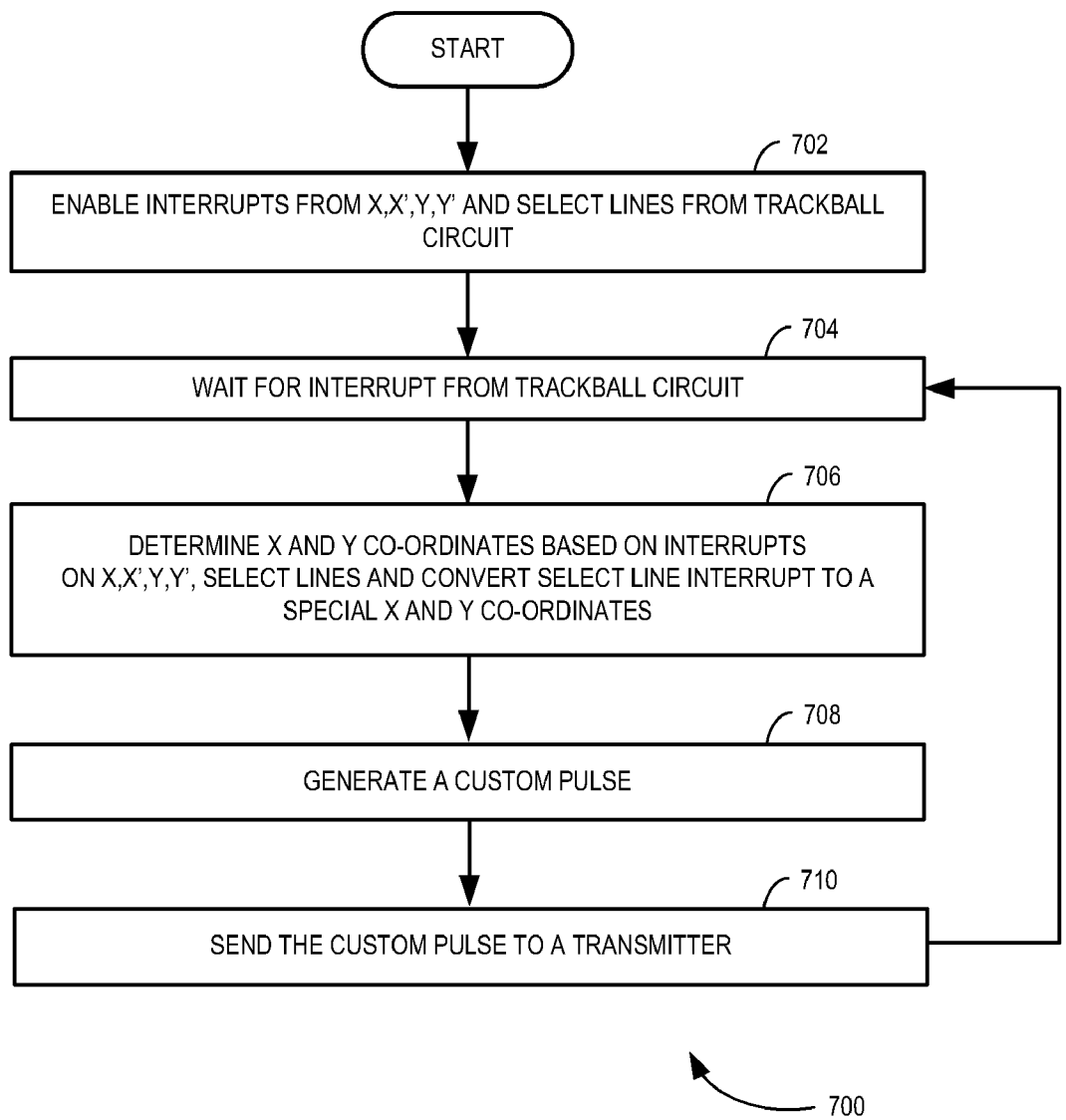
FIG. 7 shows a process flow illustrating a trackball interface, according to one embodiment.

FIG. 7 shows a process flow 700 illustrating a trackball interface, according to one embodiment. In step 702, interrupts from x, x', y, y' and SELECT line are enabled from a trackball circuit. In one embodiment, the trackball interrupt is generated upon detection of the trackball activity. In step 704, the process 700 waits for interrupt from the trackball circuit. In step 706, x and y co-ordinates are determined based on the interrupts on x, x', y, y' and SELECT lines. Also, the SELECT line interrupt is converted to a special x and y co-ordinates. In step 708, a custom pulse is generated. In step 710, the custom pulse is sent to a transmitter 112.

Figure 8:
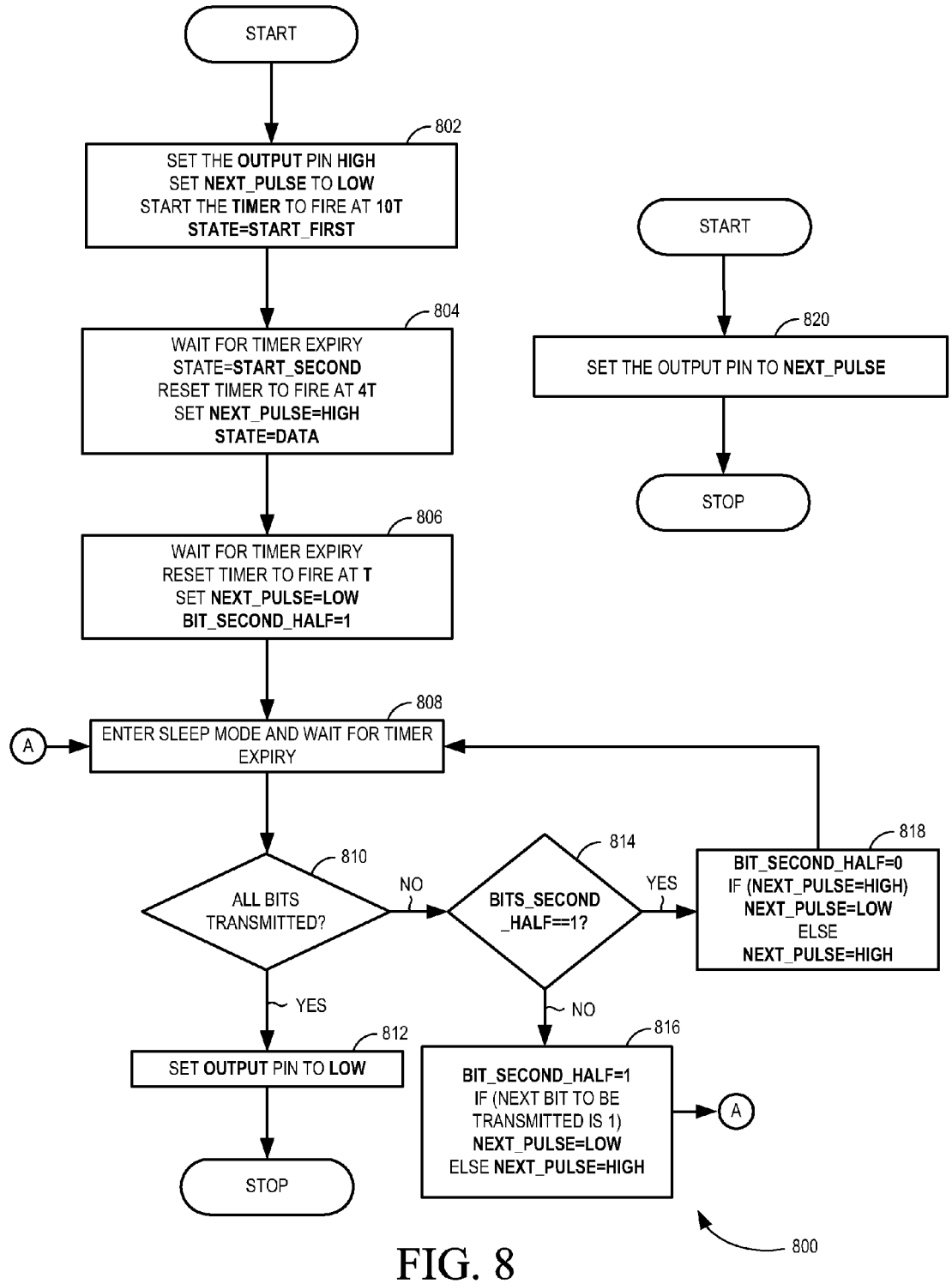
FIG. 8 shows a process flow illustrating a frame transmission, according to one embodiment.

FIG. 8 shows a process flow 800 illustrating a frame transmission, according to one embodiment. In one embodiment, the frame transmission includes transmission of bits encoded in a bi-phase encoding. In step 802, state of an output pin is set to high and state of a next pulse is set to low. Also, in step 802, timer for a bit duration of 10T is started. It can be noted that during a period of 10T, the state of the output pin is high. When the timer expires, state of the output pin is set to a value of the next pulse, which is low, as indicated by step 820.

In step 804, the timer is reset to fire at a bit duration of 4T such that the output pin is held low for a bit duration of 4T. Also, in step 804, state of the next pulse is set to high as the output pin is held low for a bit duration of 4T. In one embodiment, the step Further, step 806 is performed upon expiry of the timer which is set for a bit duration of 4T. Also, state of the output pin is set to a value of the next pulse (which is high) when the timer expires, as indicated by step 820. In step 806, the timer is reset to fire at a bit duration of 1T and state of the next pulse is set to low for transmitting second half of bit one. Further, the process 800 enters a sleep mode until the timer (e.g., which is set to a bit duration of 1T) expires as indicated in step 808. It can be noted that the process 800 performs step 810 upon expiry of the timer. In step 810, it is determined whether all bits are transmitted. If it is determined that all bits are transmitted, then state of the output pin is set to a value of the next pulse which is low as in step 812 and the process 800 is ended, else the process 800 goes to step 814.

If there are bits that remain to be transmitted, then in step 814, it is determined whether the first or second half of bit is to be transmitted. If the first half of bit is to be transmitted, then the process 800 performs step 816, and if the second half of bit is to be transmitted, then the process 800 performs step 818.

In step 816, the first half of the bit is transmitted. In this step, state of the next pulse is set to low, if bit to be transmitted is 1 and state of the next pulse is set to high, if bit to be transmitted is 0. Further, upon performing the step 816, the process 800 goes to step 808 and repeats steps 808-818.

In step 818, the second half of the bit is transmitted and the process 800 goes to step 808 and repeats steps 808-818. Further, in step 818, state of the next pulse is set to high, if the current value of next pulse is low and the next pulse is set to low, if the current value of next pulse is high. In this manner, plurality of bits encoded in bi-phase encoding is transmitted using the above described process. It is appreciated that bit-wise representation of the frame is provided as an input to the algorithm described above.

Figure 9:
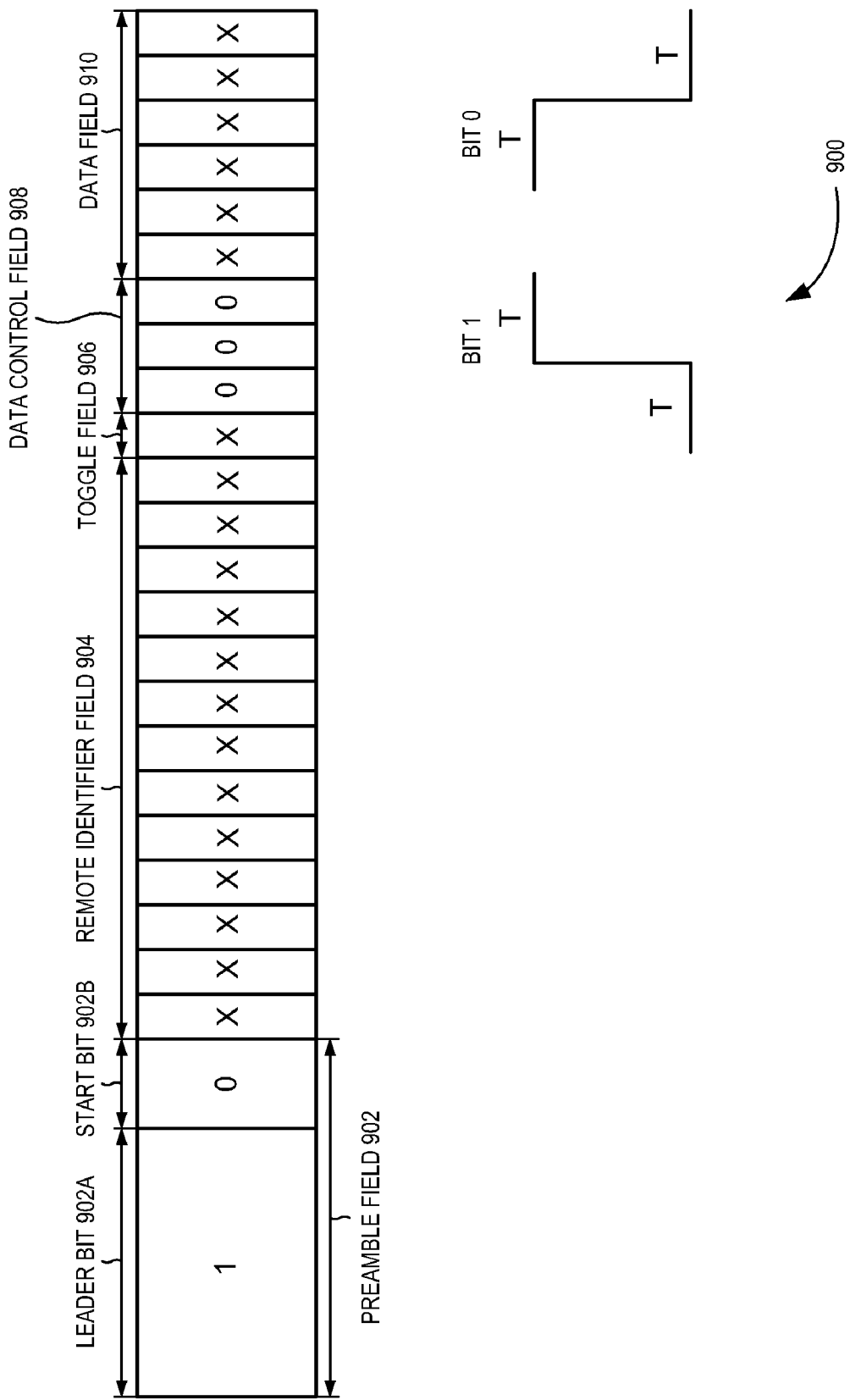
FIG. 9 shows various fields of a custom pulse generated corresponding to a key press in a QWERTY® remote control device, according to one embodiment.

FIG. 9 shows various fields of a custom pulse 900 generated corresponding to a key press in the QWERTY® remote control device 106, according to one embodiment. Particularly, FIG. 9 illustrates the custom pulse 900 for the QWERTY® remote control device 106 with 48 keys QWERTY® keypad. In some embodiments, the custom pulse 900 is generated upon processing an user input (e.g., a key press, etc.). For example, the custom pulse 900 is generated by the keypad custom pulse generator 130, upon generating the keypad scan code by the keypad scanner 120. In these embodiments, the custom pulse 900 transmits a signal to the receiver 136A of the display device 136 via the transmitter 112.

In one embodiment, the custom pulse 900 includes frames, where each frame includes bits encoded in a bi-phase encoding. In this embodiment, the custom pulse 900 includes various fields, namely a preamble field 902, a remote identifier field 904, a toggle field 906, a data control field 908, a data field 910, and an inter-frame gap between consecutive frames (not shown). As shown in FIG. 9, the preamble field 902 includes two bits, namely a leader bit 902A and a start bit 902B. The leader bit 902A is set to a high period of 10T and a low period of 4T.

Further, the start bit 902B is set to a bit duration of 2T. In some embodiments, the leader bit 902A of the preamble field 902 enables easy detection of start of the frame in noisy radio frequency (RF) environments. In these embodiments, the start bit 902B synchronizes the receiver 136A. The preamble field 902 is described in greater detail with respect to FIG. 14.

The remote identifier field 904 associates the transmitter 112 with a unique receiver (e.g., the receiver 136A of the display device 136). In one embodiment, the receiver 136A may only accept and process frame(s) from the transmitter 112 if a remote identifier indicated in the remote identifier field 904 of the frame transmitted by the transmitter 112 matches with a remote identifier pattern programmed in the receiver 136A.

In an alternate embodiment, the receiver 136A may process the frame(s) transmitted by the transmitter of a master remote control device (even if the remote identifier, indicated in the remote identifier field 904 of the frame transmitted by the master remote control device, does not match with the remote identifier pattern programmed in the receiver 136A). For example, the master remote control device includes values 0 and 0x1FFF which are reserved. In other words, the receiver 136A responds to a remote control which includes the above described special values in the remote identifier field 904. As shown in FIG. 9, the remote identifier field 904 includes thirteen bits, each bit with a bit duration of 2T.

In the example embodiment illustrated in FIG. 9, the toggle field 906 follows the remote identifier field 904. Further as shown in FIG. 9, the toggle field 906 occupies a bit, where each bit is approximately about 800 microseconds in duration. It is appreciated that, the toggle field 906 enables the receiver 136A to distinguish between a single key press on a key and multiple key presses on the same key. In some embodiments, the bit in the toggle field 906 is configured to distinguish between a single key press on a key and multiple key presses on the same key. In these embodiments, the bit in the toggle field 906 changes at every new key press.

Further, FIG. 9 shows the data control field 908 which occupies three bits, each bit with a bit duration 2T. In some embodiments, the data control field 908 is used for parsing a following data pattern. For example, a value zero in the data control field 908 notifies the receiver 136A that the data bit indicate a fixed length keypad scan code of a key on a regular keypad as shown in FIG. 9. It is appreciated that the data control field 908 enables different transmitters to use a common frame format while sending data in multiple data formats.

As illustrated, the data field 910 indicates a variable length bit pattern. The data field 910 occupies 6 bits, where each bit is 2T. It should be noted that, the termination of the data field 910 is determined by the start of a signal free time. If a low signal is detected for more than a bit duration of 4T, then the data field 910 is considered as over. It is noted that the inter-frame gap is inserted between two consecutive frames. The inter-frame gap between two consecutive frames is a minimum duration (e.g., greater than 10 msec) between two frame transmissions. In one embodiment, the inter-frame gap is inserted between two consecutive frames to ensure that any spurious or incorrect frames are rejected.

It can be seen from FIG. 9 that, total bit time is calculated as bit time of the preamble field 902+bit time of the remote identifier field 904+bit time of the toggle field 906+bit time of the data control field 908+bit time of the data field 910+bit time of inter-frame gap, i.e., the total bit time=[(10T+4T+2T)+(13*2T)+(2T)+(3*2T)+(6*2T)+30 msec]=[62T+30 msec]. Given T=400 μsec. The total bit time=[(62*400 μsec)+30 msec]=[24.8 msec+30 msec]=54.8 msec.

Figure 10:
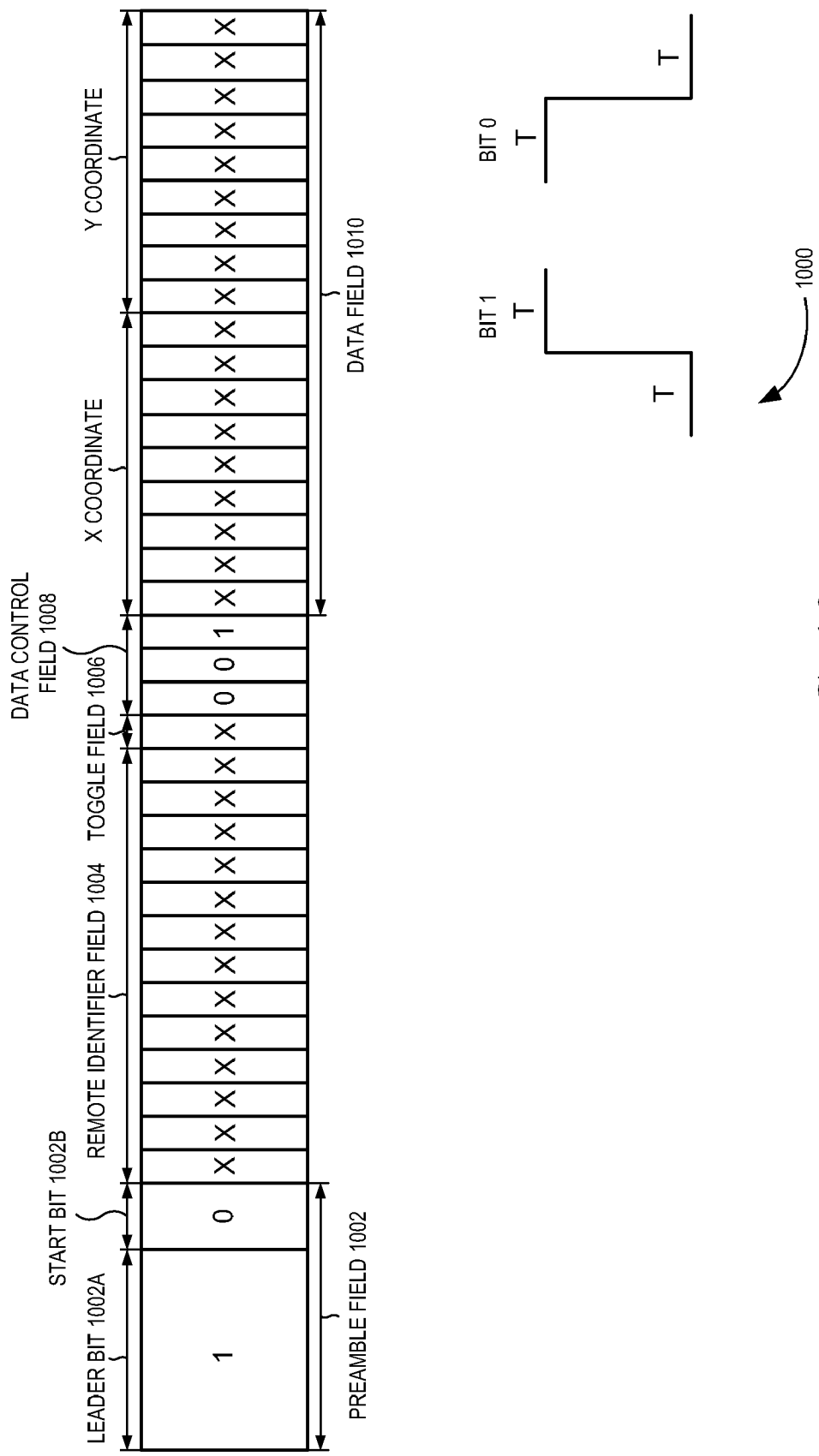
FIG. 10 shows various fields of a custom pulse generated corresponding to a touchpad or a trackball activity, according to one embodiment.

FIG. 10 shows various fields of a custom pulse 1000 generated corresponding to a touchpad or a trackball activity, according to one embodiment. Particularly, FIG. 10 illustrates the custom pulse 1000 generated for the QWERTY® remote control device 106 with 512×512 touchpad or trackball. In some embodiments, the custom pulse 1000 is generated upon processing an user input (e.g., a touchpad activity, a trackball activity, etc.). For example, the custom pulse 1000 is generated by the touchpad custom pulse generator 132 or the trackball custom pulse generator 134 upon generating a touchpad scan code and a trackball scan code respectively. In these embodiments, the custom pulse 1000 transmits a signal to the receiver 136A of the display device 136 via the transmitter 112.

In one embodiment, the custom pulse 1000 includes frames, where each frame includes bits encoded in a bi-phase encoding. In this embodiment, the custom pulse 1000 includes various fields, namely a preamble field 1002, a remote identifier field 1004, a toggle field 1006, a data control field 1008, a data field 1010, and an inter-frame gap between consecutive frames (not shown). As shown in FIG. 10, the preamble field 1002 includes two bits, namely a leader bit 1002A and a start bit 1002B. The leader bit 1002A is set to a high period of 10T and a low period of 4T. Further, the start bit 1002B is set to a bit duration of 2T. In some embodiments, the leader bit 1002A of the preamble field 1002 enables easy detection of start of the frame in noisy radio frequency (RF) environments. In these embodiments, the start bit 1002B synchronizes the receiver 136A. The preamble field 1002 of the custom pulse 1000 is described in greater detail with respect to FIG. 14.

The remote identifier field 1004 associates the transmitter 112 with a unique receiver (e.g., the receiver 136A of the display device 136). In one embodiment, the receiver 136A may only accept and process frame(s) from the transmitter 112, if a remote identifier indicated in the remote identifier field 1004 of the frame transmitted by the transmitter 112 matches with a remote identifier pattern programmed in the receiver 136A. In an alternate embodiment, the receiver 136A may process the frame(s) transmitted by the transmitter of a master remote control device (even if the remote identifier indicated in the remote identifier field 1004 of the frame transmitted by the master remote control device does not match with the remote identifier pattern programmed in the receiver 136A). For example, the master remote control device includes values 0 and 0x1FFF which are reserved. In other words, the receiver 136A responds to a remote control which includes the above described special values in the remote identifier field 1004. As shown in FIG. 10, the remote identifier field 1004 includes thirteen bits, each bit with a bit duration of 2T.

In the example embodiment illustrated in FIG. 10, the toggle field 1006 follows the remote identifier field 1004. Further, as shown in FIG. 10, the toggle field 1006 occupies a bit and each bit is approximately about 800 microseconds in duration. It is appreciated that the toggle field 1006 enables the receiver 136 to distinguish between a single touchpad or trackball activity and multiple touchpad or trackball activities on the same touchpad or trackball. In some embodiments, the bit in the toggle field 1006 is configured to distinguish between a single touchpad or trackball activity and multiple touchpad or trackball activities on the same touchpad or trackball. In these embodiments, the bit in the toggle field 1006 changes at every new touchpad or trackball activity.

Further, FIG. 10 shows the data control field 1008 which occupies three bits, each bit with a bit duration 2T. In some embodiments, the data control field 1008 is used for parsing a following data pattern (i.e., parses x and y coordinates corresponding to the touchpad or trackball activity). For example, a value zero in the data control field 1008 notifies the receiver 136A that data bits indicate a fixed length keypad scan code of a key on a regular keypad, while a value one notifies the receiver 136A that the data bits indicate x and y coordinates of a touchpad or a trackball of the handheld electronic apparatus 106. It is appreciated that the data control field 1008 enables different transmitters to use a common frame format while sending data in multiple data formats.

As illustrated, the data field 1010 indicates a variable length bit pattern. It can be seen from FIG. 10 that the data field 1010 occupies 18 bits, where x and y coordinates of the touchpad or trackball occupy 9 bits respectively. Further, each bit is having a bit duration of 2T. It should be noted that, the termination of the data field 1010 is determined by the start of a signal free time. In one embodiment, a low signal detected for more than a bit duration of 4T indicates end of the data field 1010. It is appreciated that the inter-frame gap is inserted between two consecutive frames. The inter-frame gap between two consecutive frames is a minimum duration (e.g., greater than 10 msec) between two frame transmissions. In one embodiment, the inter-frame gap is inserted between two consecutive frames to ensure that any spurious or incorrect frames are rejected.

It can be seen from FIG. 10 that, total bit time is calculated as bit time of the preamble field 1002+bit time of the remote identifier field 1004+bit time of the toggle field 1006+bit time of the data control field 1008+bit time of the data field 1010+bit time of inter-frame gap (which is 30 msec in this example), i.e., the total bit time=[(10T+4T+2T)+(13*2T)+(2T)+(3*2T)+(18*2T)+30 msec]=[86T+30 msec]. Given T=400 μsec. The total bit time=[(86*400 μsec)+30 msec]=[34.4 msec+30 msec]=64.4 msec.

Figure 11:
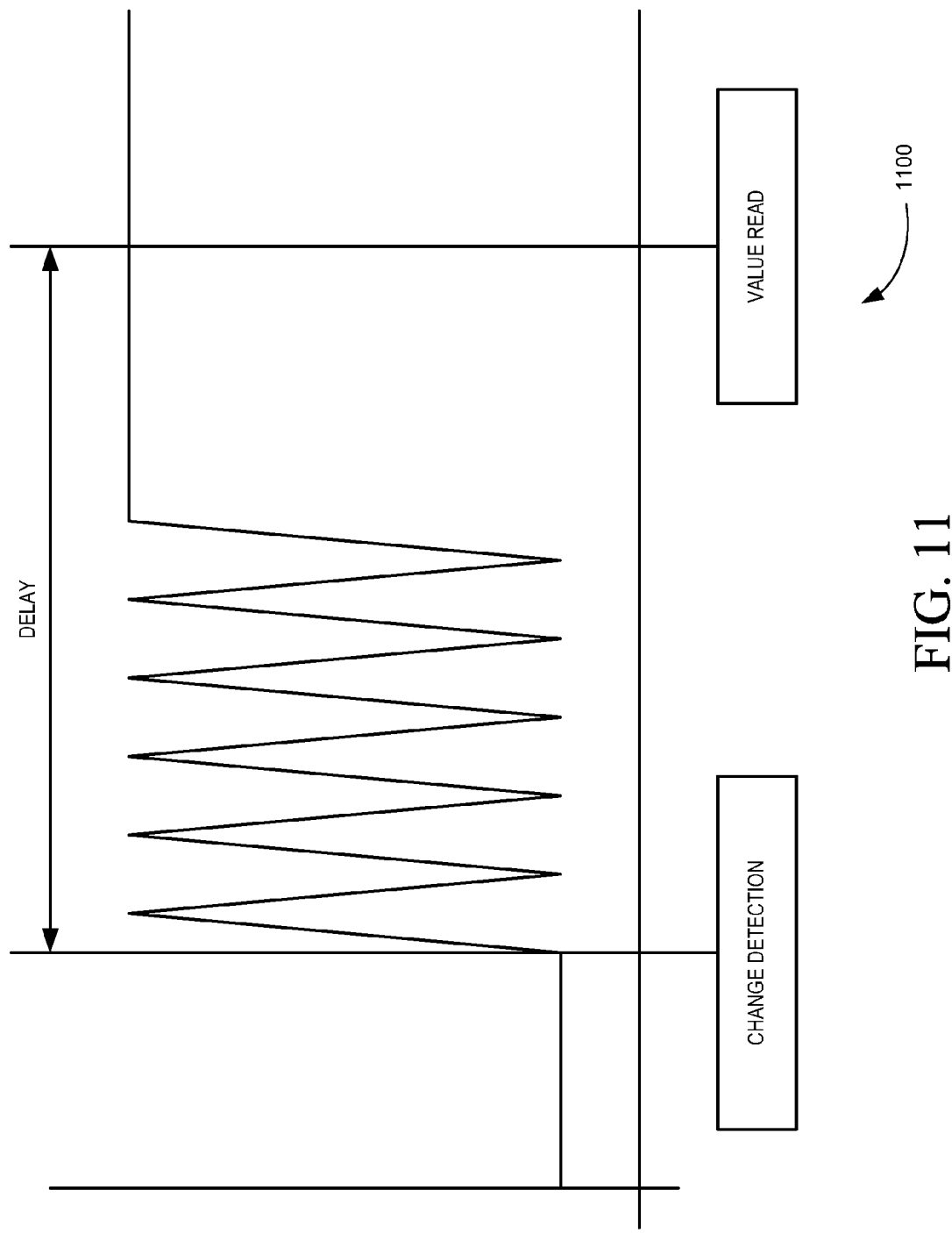
FIG. 11 shows a contact bounce when a key on a keypad is pressed, according to one embodiment.

FIG. 11 shows a contact bounce when a key on a keypad is pressed, according to one embodiment. Particularly, FIG. 11 shows a delay in reading a value of a pin due to the contact bounce when the key is pressed. Typically, when a key in a keypad is pressed, contact bounces for a period of time. The contact bounce gradually decreases before settling in a steady on-state. During the contact bounce, value of the pin may be high or low (as illustrated in FIG. 11).

Further, during the period of the contact bounce, multiple key presses may generate. Hence, for accurate reading of value (i.e., actual state) of the pin corresponding to the key press, it is desirable to read the value of the pin after a time interval, upon receiving a key press interrupt (i.e., upon settling of the contact bounce). It is appreciated that, reading the value of the pin corresponding to the key press eliminates errors due to noise spikes on column and row lines of the keypad scan code matrix 506. For eliminating the contact bounce when a key is pressed, the keypad scan code matrix handling takes place as follows:

key_init—initializes all global variables, I/O ports, pin change and timer ISR key_stop—is called after key is pressed pin_change_isr—is called whenever any key is pressed. This starts the timer and exits interrupt routine timer_ovf_isr—this ISR reads the levels at I/O ports and indexes in table to find the scan code of the key pressed It can be noted from the above described actions that, main key processing is performed in the timer ISR and not in the pin change ISR. This helps to eliminate the contact bounce.

Figure 12:
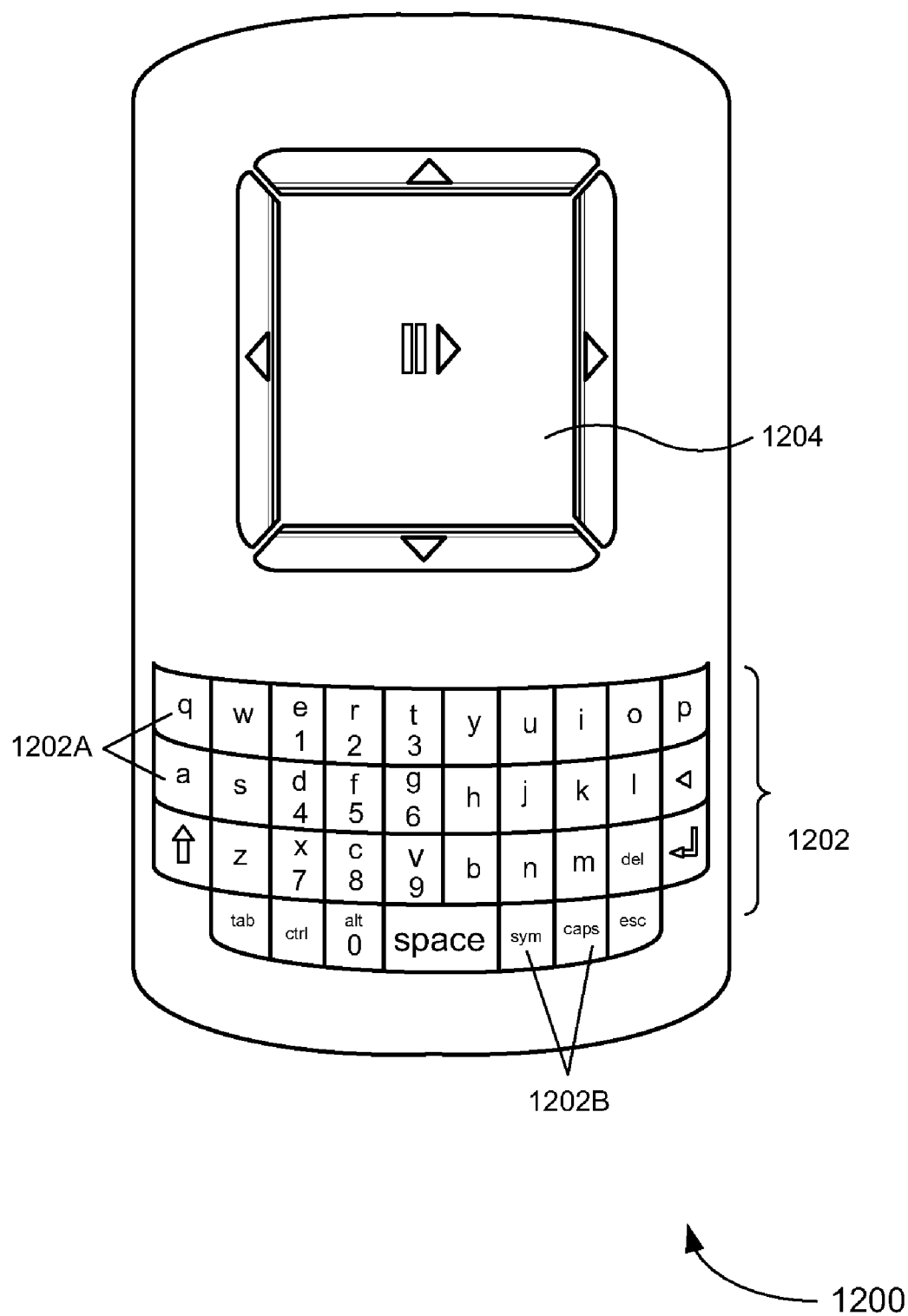
FIG. 12 shows a QWERTY® remote control device with a touchpad, according to one embodiment.

FIG. 12 shows a QWERTY® remote control device 1200 with a touchpad 1204, according to one embodiment. Particularly, the QWERTY® remote control device 1200 includes a QWERTY® keypad 1202, and the touchpad 1204. Further as shown in FIG. 12, the QWERTY® keypad 1202 includes a set of QWERTY® keypad keys 1202A, a set of multiplex keys (e.g., 'e' and '1', 'r' and '2', etc.), and a set of alternation keys 1202B (e.g., CAPS, NUM, SYM, etc.) configured to perform a dual mode function.

In one exemplary implementation, the QWERTY® keypad 1202 enables the user 102 to input a web address for accessing media on the Internet. Further, navigation keys (e.g., up, down, right and left arrow keys) enable the user 102 to efficiently navigate through a vast domain of the Internet media on the Internet TV 104. The set of alteration keys 1202B enables a toggle function. It is appreciated that, a first key press on an alternation key enables a secondary mode for the alternation key, and a second key press on the same alternation key enables a primary mode for the alternation key. In some embodiments, the set of multiplex keys is configured to perform a set of navigation functions when a receiver 136A is in a browse mode and to perform a set of trickmode functions (e.g., the functions which enable playing media content in a fast-forward mode, One skilled in the art will appreciate that the touchpad 1204 in the QWERTY® remote control device 1200 provides a primary control interface for menu navigation, cursor movement, and a platform for interactive input such that effective accessing of media on the Internet TV 104 is experienced by the user 102. For example, the touchpad 1204 may facilitate the user 102 to navigate the Internet media by tapping a finger on the touchpad 1204, i.e., the user 102 may play/pause/stop a video by tapping on the touchpad 1204 and/or can also use the touchpad 1204 via finger(s) movement for accessing contents available on the Internet TV 104. One skilled in the art can envision that the touchpad 1204 used in the QWERTY® remote control device 1200 of the present invention is similar to any other touchpad used for navigation in other devices such as IPOD, laptop, and the like. Further, it is appreciated that the QWERTY® remote control device 1200 with the touchpad 1202 is one exemplary embodiment of the handheld electronic apparatus 106 of FIG. 1.

Figure 13:
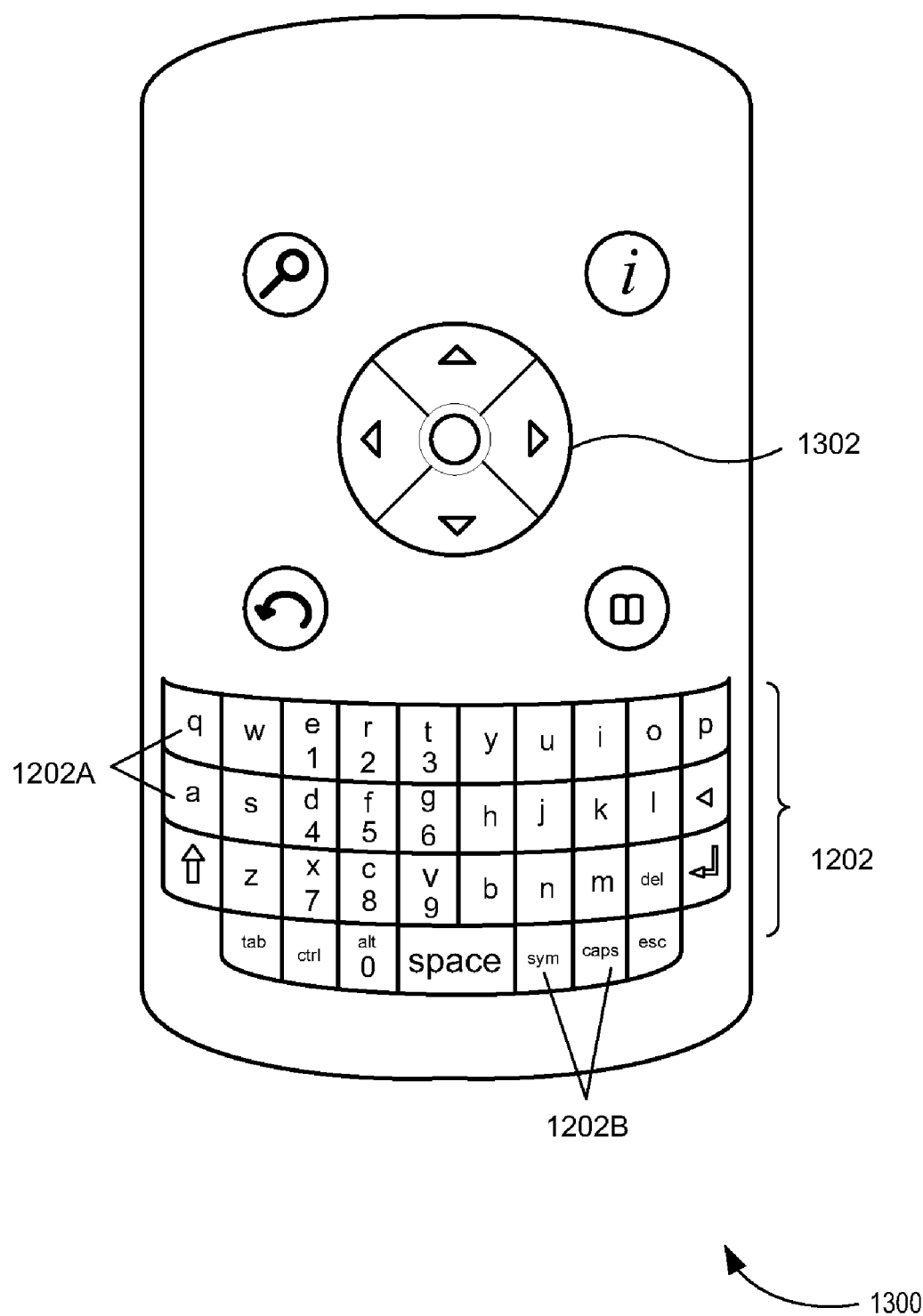
FIG. 13 shows a QWERTY® remote control device with a trackball, according to another embodiment.

FIG. 13 shows a QWERTY® remote control device 1300 with a trackball 1302, according to another embodiment. Particularly, the QWERTY® remote control device 1300 includes a QWERTY® keypad 1202, and the trackball 1302. Further as shown in FIG. 13, the QWERTY® keypad 1202 includes a set of QWERTY® keypad keys 1202A, a set of multiplex keys, and a set of alternation keys 1202B (e.g., CAPS, NUM, SYM, etc.) configured to perform a dual mode function.

In one exemplary implementation, the QWERTY® keypad 1202 enables the user 102 to input a web address for accessing media on the Internet. Further, the navigation keys enable the user 102 to efficiently navigate through a vast domain of the Internet media on the Internet TV 104. In addition, the set of alteration keys 1202B enables a toggle function.

The trackball 1302 of the QWERTY® remote control device 1300 is a pointing device (consisting of a ball housed in a socket containing sensors to detect rotation of the ball about two axes) which enables menu navigation, cursor movement, etc. In the example embodiment illustrated in FIG. 13, the trackball 1302 includes up, down, right, left arrow keys to facilitate the user 102 to navigate easily. It is appreciated that the QWERTY® remote control device 1300 with the trackball 1302 is another exemplary embodiment of the handheld electronic apparatus 106 of FIG. 1. One skilled in the art can envision that the QWERTY® remote control device 1300 may include both trackball and touchpad along with the QWERTY® keypad for accessing of the Internet media on the Internet TV 104.

Figure 14:
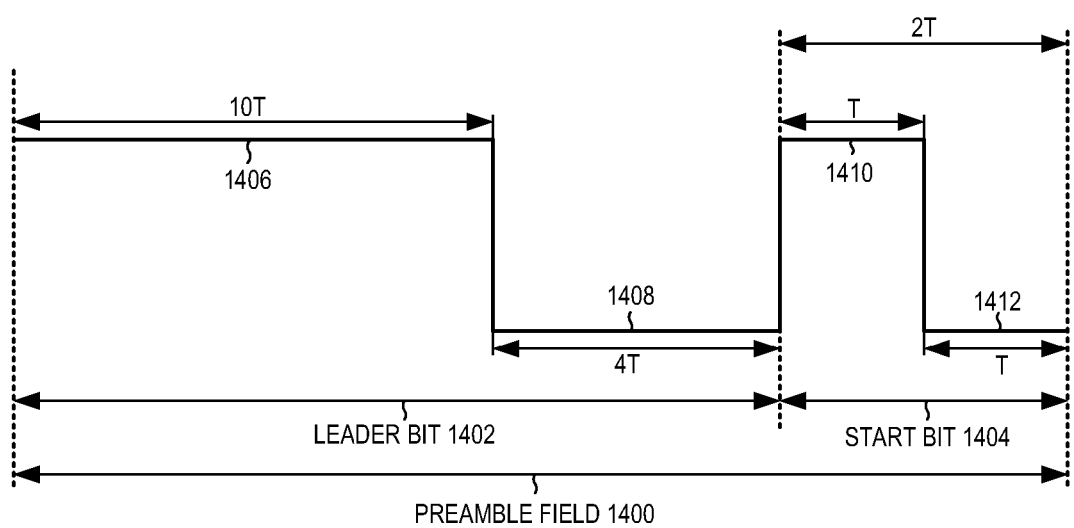
FIG. 14 shows a preamble field of the custom pulse generated by the processor, according to one embodiment.

FIG. 14 shows a preamble field 1400 of the custom pulse generated by the processor 110, according to one embodiment. Particularly, FIG. 14 illustrates the preamble field 1400 of a plurality of bits encoded in a bi-phase encoding. In some embodiment, the plurality of bits encoded in the bi-phase encoding is a part of a frame transmitted by the transmitter 112 of the handheld electronic apparatus 106 to the receiver 136A of the display device 136. It is appreciated that the preamble field 1400 is an exemplary implementation of the preamble field 902 and the preamble field 1002 of FIG. 9 and FIG. 10 respectively.

As shown in FIG. 14, the preamble field 1400 includes 2 bits, i.e., a leader bit 1402 and a start bit 1404. It can be seen from FIG. 14 that the leader bit 1402 includes a high period of 10T (indicated by a reference numeral 1406) and a low period of 4T (indicated by a reference numeral 1408). Also, it can be seen from FIG. 14 that, the start bit 1404 includes a bit duration of 2T (i.e., a high period of 1T (indicated by a reference numeral 1410) and a low period of 1T (indicated by a reference numeral 1412)).

In one embodiment, the leader bit 1402 in the preamble field 1400 detects start of the frame in a noisy RF environment. In this embodiment, noise at the receiver is filtered by setting the leader bit 1402 low for a period of 4T after setting the leader bit 1402 high for a period of 10T. It is appreciated that filtering of noise enables the receiver 136A to authenticate the RF frames (and allow only genuine RF frame). In another embodiment, data transmission with the receiver 136A is synchronized by setting the start bit 1404 to one and setting a bit duration of the start bit 1404 to 2T.

Figure 15:
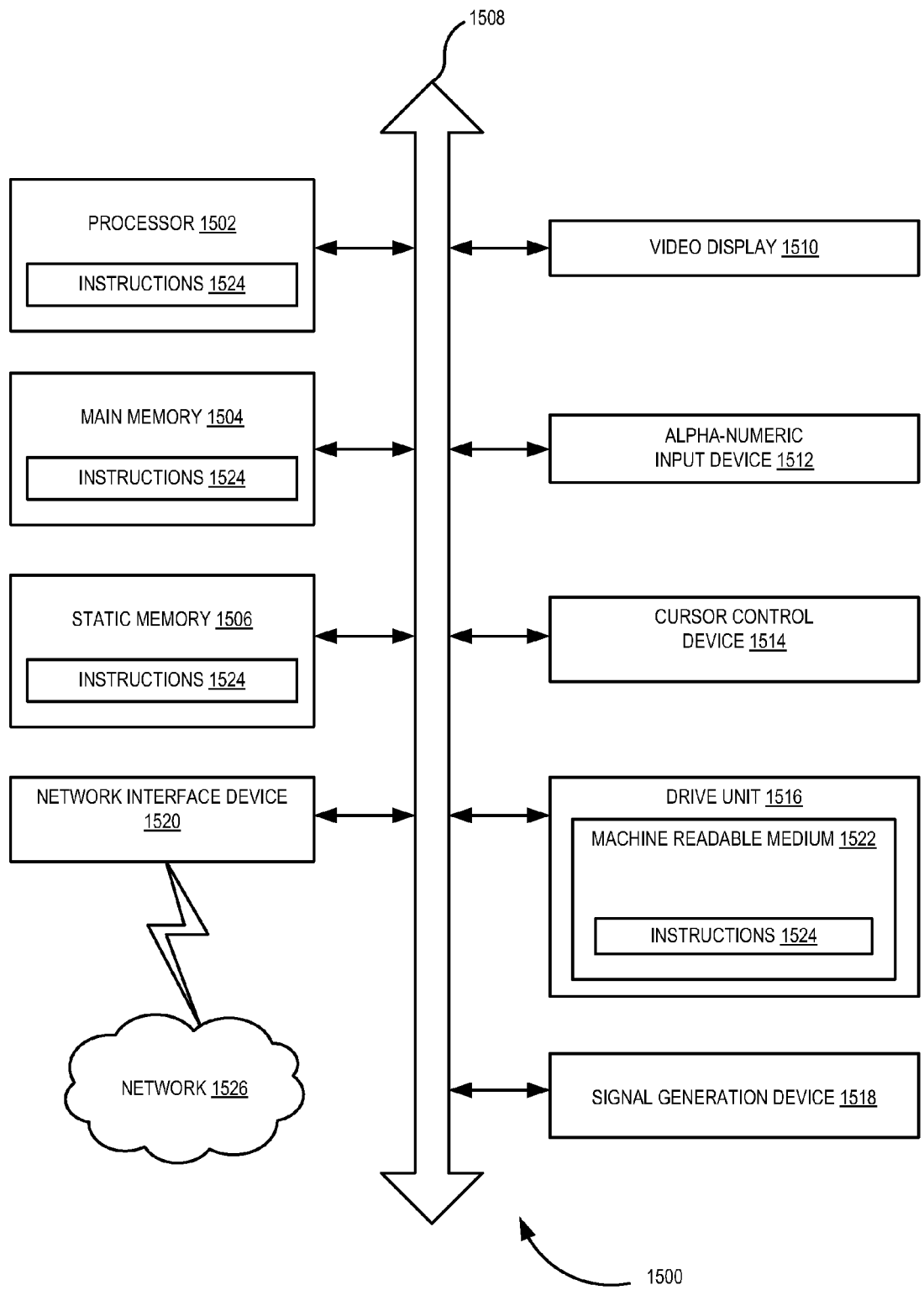
FIG. 15 shows a diagrammatic system view of a data processing system in which any of the embodiments disclosed herein may be performed, according to one embodiment.

FIG. 15 shows a diagrammatic system view 1500 of a data processing system in which any of the embodiments disclosed herein may be performed, according to one embodiment. Particularly, the diagrammatic system view of FIG. 15 illustrates a processor 1502, a main memory 1504, a static memory 1506, a bus 1508, a video display 1510, an alphanumeric input device 1512, a cursor control device 1514, a drive unit 1516, a signal generation device 1518, a network interface device 1520, a machine readable medium 1522, instructions 1524 and a network 1526.

The diagrammatic system view 1500 may indicate a personal computer and/or a data processing system in which one or more operations disclosed herein are performed. The processor 1502 may be a microprocessor, a state machine, an application specific integrated circuit, a field programmable gate array, etc. The main memory 1504 may be a dynamic random access memory and/or a primary memory of a computer system. The static memory 1506 may be a hard drive, a flash drive, and/or other memory information associated with the data processing system.

The bus 1508 may be an inter-connection between various circuits and/or structures of the data processing system. The video display 1510 may provide graphical representation of information on the data processing system. The alpha-numeric input device 1512 may be a keypad, keyboard and/or any other input device of text (e.g., a special device to aid the physically handicapped). The cursor control device 1514 may be a pointing device such as a mouse. The drive unit 1516 may be a hard drive, a disk system, and/or other longer term storage subsystem.

The signal generation device 1518 may be a bios and/or a functional operating system of the data processing system. The network interface device 1520 may perform interface functions (e.g., code conversion, protocol conversion, and/or buffering) required for communications to and from the network 1526 between a number of independent devices (e.g., of varying protocols). The machine readable medium 1522 may provide instructions on which any of the methods disclosed herein may be performed. The instructions 1524 may provide source code and/or data code to the processor 1502 to enable any one or more operations disclosed herein.

The above-described handheld apparatus enables a user to navigate through a sophisticated Internet interface to locate desired media content while browsing the Internet TV. The above-described device enables the user to enter a web address for accessing media resource on the Internet and provides efficient surfing medium for surfing through the media content available on the Internet. The above described device not only provides a way to connect the Internet TV with Internet without a computer but also provides means for sophisticated navigation on the Internet TV. The above-described Internet Television remote control facilitates a user to type search string(s) much faster using the QWERTY® keypad.

Although the present embodiments have been described with reference to specific example embodiments, it will be evident that various modifications and changes may be made to these embodiments without departing from the broader spirit and scope of the various embodiments.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An Internet Television remote control device that can be held in one hand and communicatively coupling a user and an Internet Television, the Internet Television remote control device comprising:
a QWERTY® keypad and a touchpad configured to accept a user input to navigate through the Internet via the Internet Television to locate multimedia content;
a display area to display the user input;
a processor configured to generate a custom pulse by processing the user input, wherein the custom pulse comprises a plurality of frames and each frame includes a plurality of bits encoded in a bi-phase encoding, and the plurality of bits comprises a preamble field, a remote identifier field, a toggle field, a data control field, a data field and an inter-frame gap between consecutive frames,
a keypad controller and a touchpad controller communicatively coupled with the processor and configured to control the QWERTY® keypad and touchpad respectively; and
a transmitter configured to transmit the custom pulse to a display device of the Internet Television, wherein a receiver of the display device of the Internet Television is adapted to receive the custom pulse transmitted by the transmitter.

2. The Internet Television remote control device of claim 1, wherein the QWERTY® keypad comprises keys selected from a group consisting of a set of QWERTY® keypad keys, a set of multiplex keys, and a set of alteration keys configured to perform a dual mode function, and wherein a first key press on an alteration key enables a secondary mode for the alteration key, and a second key press on the same alteration key enables a primary mode for the alteration key.

3. The Internet Television remote control device of claim 2, wherein the set of multiplex keys is configured to perform a set of navigation functions when the receiver of the display device is in a browse mode and to perform a set of trickmode functions when the receiver of the display device is in a playback mode.

4. The Internet Television remote control device of claim 1 wherein the keypad controller is adapted to generate a keypad interrupt to the processor upon receiving a key press, and the keypad controller comprises a keypad scanner configured to identify a keypad scan code corresponding to the key press on the QWERTY® keypad in a keypad scan code matrix.

5. The Internet Television remote control device of claim 4, wherein the keypad scan code matrix is a m×n matrix including n bits of column lines and m bits of row lines that are connected to (m+n) input/output (I/O) lines of the processor, and wherein the keypad scan code matrix includes a set of regular keypad scan codes, a set of capital alphabet keypad scan codes, a set of numeric keypad scan codes and a set of symbolic keypad scan codes.

6. The Internet Television remote control device of claim 4, wherein the processor comprises a keypad custom pulse generator configured to generate the custom pulse to transmit the keypad scan code.

7. An Internet Television remote control device that can be held in one hand and communicatively coupling a user and an Internet Television, the Internet Television remote control device comprising:
a QWERTY® keypad, a touchpad, and a trackball configured to accept a user input, wherein the user input comprises a request to navigate through the Internet via the Internet Television to locate a multimedia content;
a display area to display the user input;
a processor configured to generate a custom pulse by processing the user input, wherein the custom pulse comprises a plurality of frames and each frame includes a plurality of bits encoded in a bi-phase encoding, and the plurality of bits comprises a preamble field, a remote identifier field, a toggle field, a data control field, a data field and an inter-frame gap between consecutive frames,
a keypad controller, a touchpad controller, and a trackball controller communicatively coupled with the processor via input/output (I/O) lines of the processor, an universal asynchronous receiver/transmitter (UART) link, and a set of input/output (I/O) lines respectively and configured to control the QWERTY® keypad, the touchpad, and the trackball respectively; and
a transmitter configured to transmit the custom pulse to a display device of the Internet Television, wherein a receiver of the display device of the Internet Television is adapted to receive the custom pulse transmitted by the transmitter.

8. The Internet Television remote control device of claim 7, wherein the touchpad to accept the user input comprises a touchpad activity indicated by an activation of the touchpad in a control mode or in a navigation mode.

9. The Internet Television remote control device of claim 8, wherein the touchpad controller is adapted to generate a touchpad interrupt to the processor upon detecting the touchpad activity, the touchpad controller comprises:
a touchpad coordinate identifier configured to determine a set of coordinates on the second interface indicated by the touchpad activity; and
a touchpad scanner configured to locate a touchpad scan code for the set of coordinates on the second interface in a touchpad scan code matrix.

10. The Internet Television remote control device of claim 9, wherein the processor comprises a touchpad custom pulse generator configured to generate the custom pulse to transmit the touchpad scan code.

11. An Internet Television remote control device that can be held in one hand and communicatively coupling a user and an Internet Television, the Internet Television remote control device comprising:
a QWERTY® keypad and a trackball configured to accept a user input;
a display area to display the user input;
a processor configured to generate a custom pulse by processing the user input, wherein the custom pulse comprises a plurality of frames and each frame includes a plurality of bits encoded in a bi-phase encoding, and the plurality of bits comprises a preamble field, a remote identifier field, a toggle field, a data control field, a data field and an inter-frame gap between consecutive frames,
a keypad controller and a trackball controller communicatively coupled with the processor via input/output (I/O) lines and configured to control the QWERTY® keypad and the trackball respectively; and
a transmitter configured to transmit the custom pulse to a display device of the Internet Television, wherein a receiver of the display device of the Internet Television is adapted to receive the custom pulse transmitted by the transmitter.

12. The Internet Television remote control device of claim 11, wherein the trackball to accept the user input comprises a trackball activity indicated by an activation of the trackball in a control mode or in a navigation mode.

13. The Internet Television remote control device of claim 12, wherein the trackball controller is adapted to generate a trackball interrupt to the processor upon detecting the trackball activity, the trackball controller comprises:
a trackball coordinate identifier configured to determine a set of coordinates on the third interface indicated by the trackball activity; and
a trackball scanner configured to locate a trackball scan code for the set of coordinates on the third interface in a trackball scan code matrix.

14. The Internet Television remote control device of claim 11, wherein the processor comprises a trackball custom pulse generator configured to generate the custom pulse to transmit the trackball scan code.

15. The Internet Television remote control device of claim 11, wherein the user input comprises a request to navigate the Internet via the Internet Television to locate multimedia contents.

16. A method of communicatively coupling a user and a display device of an Internet Television using an Internet Television remote control device that can be held in one hand, the method comprising:
accepting a user input via a QWERTY® keypad and touchpad of the Internet Television remote control device;
displaying the user input in a display area of the Internet Television remote control device;
generating a signal by processing the user input by a processor of the Internet Television remote control device; and
transmitting the signal by a transmitter of the Internet Television remote control device to the display device of the Internet Television, wherein the user input comprises a request to navigate the Internet via the Internet Television to locate a multimedia content, wherein generating the signal by processing the user input by the processor comprises:
generating a custom pulse for the generated signal; and
transmitting the custom pulse via the transmitter to a receiver attached to the display device, wherein the custom pulse comprises a plurality of frames and each frame comprises a plurality of bits encoded in a bi-phase encoding, and the plurality of bits comprises a preamble field, a remote identifier field, a toggle field, a data control field, a data field and an inter-frame gap between consecutive frames.

17. The method of claim 16, wherein, the QWERTY® keypad comprises a set of keys selected from a group comprising QWERTY® keypad keys, a set of navigation keys, and a set of alteration keys to perform a dual mode function, and wherein a first key press on an alteration key enables a secondary mode for the alteration key, and a second key press on the same alteration key enables a primary mode for the alteration key.

18. The method of claim 16, wherein accepting the user input via the touchpad further comprises:
generating a touchpad interrupt to the processor upon detecting a touchpad activity;
determining a set of coordinates on the touchpad indicated by the touchpad activity; and
locating a touchpad scan code for the set of coordinates in a touchpad scan code matrix.

19. The method of claim 16, further comprising: programming a remote identifier in the receiver attached to the display device; and for each of the plurality of frames transmitted by the transmitter,
processing the transmitted frame if a remote identifier indicated in the remote identifier field of the frame matches with the remote identifier programmed in the receiver or if the transmitter is a master remote control device.

20. The method of claim 19, wherein the toggle field occupies a bit and each bit is approximately about 800 microseconds in duration, wherein the bit is configured to distinguish between a single key press on a key and multiple key press on the same key.

21. The method of claim 20, wherein the data control field enables different transmitters to use a common frame format while sending data in multiple data formats.

22. The method of claim 21, wherein a value zero in data control field notifies the receiver that data bits indicate a fixed length keypad scan code of a key on a regular keypad, while a value one notifies the receiver that the data bits indicate x and y coordinates of the touchpad.

23. The method of claim 16, wherein the preamble field detects a start of the frame, the detecting comprises:
filtering noise at the receiver by setting a leader bit low for a period of 4T after setting the leader bit high for a period of 10T, wherein filtering enables the receiver to authenticate radio frequency (RF) frames; and synchronizing data transmission with the receiver by setting a start bit to one and setting a bit duration of the start bit to 2T.

24. A non-transitory machine-readable medium embodying a set of instructions that, when executed by a machine, causes the machine to perform the method of communicatively coupling a user and a display device of an Internet Television using an Internet Television remote control device that can be held in one hand, the method comprising:
accepting a user input via a QWERTY® keypad and touchpad of the Internet Television remote control device;
displaying the user input in a display area of the Internet Television remote control device;
generating a signal by processing the user input by a processor of the Internet Television remote control device; and
transmitting the signal by a transmitter of the Internet Television remote control device to the display device of the Internet Television, wherein the user input comprises a request to navigate the Internet via the Internet Television to locate a multimedia content, wherein generating the signal by processing the user input by the processor comprises:
generating a custom pulse for the generated signal; and
transmitting the custom pulse via the transmitter to a receiver attached to the display device, wherein the custom pulse comprises a plurality of frames and each frame comprises a plurality of bits encoded in a bi-phase encoding, and the plurality of bits comprises a preamble field, a remote identifier field, a toggle field, a data control field, a data field and an inter-frame gap between consecutive frames.

25. The Internet Television remote control device of claim 1, wherein the keypad controller and the touchpad controller are communicatively coupled with the processor via an input/output (I/O) lines of the processor and a universal asynchronous receiver/transmitter (UART) link respectively.

26. The Internet Television remote control device of claim 1, further comprising a receiver to receive feedback from the Internet Television.

27. The Internet Television remote control device of claim 1, wherein the preamble field comprises a leader bit and a start bit, wherein the leader bit enables detection of a start of a frame in noisy radio frequency (RF) environments, and wherein noise at the receiver of the display device is filtered by setting the leader bit low for a period of 4T after setting the leader bit high for a period of 10T to authenticate the RF frames, and wherein data transmission with the receiver is synchronized by setting the start bit to one and setting a bit duration of the start bit to 2T.

* * * * *